(12) United States Patent
Kuijper et al.

(10) Patent No.: US 7,751,290 B2
(45) Date of Patent: Jul. 6, 2010

(54) METHOD AND APPARATUS FOR DETERMINING WRITE STRATEGY PARAMETER VALUES FOR WRITING DATA ON AN OPTICAL DISK

(75) Inventors: Maarten Kuijper, Helmond (NL); Tony P. van Endert, Lommel (BE); Erwin Lekens, Lede (BE)

(73) Assignee: Lite-On It Corporation, Taipei (TW)

( * ) Notice: Subject to any disclaimer, the term of this patent is extended or adjusted under 35 U.S.C. 154(b) by 477 days.

(21) Appl. No.: 11/867,161

(22) Filed: Oct. 4, 2007

(65) Prior Publication Data

US 2009/0092010 A1    Apr. 9, 2009

(51) Int. Cl.
*G11B 7/00* (2006.01)
(52) U.S. Cl. .................... 369/53.2; 369/59.11
(58) Field of Classification Search ........... None
See application file for complete search history.

(56) References Cited

U.S. PATENT DOCUMENTS

2003/0058765 A1* 3/2003 Schreurs et al. .......... 369/47.53
2003/0142603 A1* 7/2003 Nakajo ..................... 369/53.2
2005/0025005 A1* 2/2005 Hwang et al. ............ 369/47.21
2006/0158981 A1* 7/2006 Meinders et al. ........... 369/47.5

* cited by examiner

*Primary Examiner*—Peter Vincent Agustin
(74) *Attorney, Agent, or Firm*—WPAT, PC; Justin King

(57) ABSTRACT

The invention relates to a method for determining write strategy parameter values for writing data on an optical disk from a group of optical disks of different types using an optical disk drive, in particular to different types of BD disks. The method includes identifying the type of optical disk, the type of optical disk being associated with a standard write strategy with standard write strategy parameters; determining a cluster write strategy with cluster write strategy parameters, the number of cluster write strategy parameters being smaller than the number of standard write strategy parameters; initializing the cluster write strategy parameters with initial cluster write strategy parameter values; and optimizing cluster write strategy parameter values for at least a subset of the cluster write strategy parameters. The optimizing is preferably performed on optimization sets of cluster write strategy parameters in a pre-determined optimization order.

17 Claims, 10 Drawing Sheets

METHOD AND APPARATUS FOR DETERMINING WRITE STRATEGY PARAMETER VALUES FOR WRITING DATA ON AN OPTICAL DISK

FIELD

The present invention relates to a method, a corresponding apparatus, a corresponding optical disk and a computer program product for determining write strategy parameter values for writing data on an optical disk.

BACKGROUND

To write properly on an optical disc a laser is controlled with a certain pattern, a so-called write strategy. Mostly, but not always, write strategies are stored on the disc with write strategy parameters, for instance as information stored in a modulated wobble for DVD recordable and rewritable discs and for BD recordable and rewritable discs (BD-R and BD-RE respectively). But this information is not always the correct or the optimum write strategy because the write strategy tuned by the disc manufacturer is generally done on a certain reference drive. The optical path of these reference drives is different compared with practical optical drives. The write strategy stored on the disc is thus not the optimal one for use in a practical optical disc drive, and depending on the system margins of the practical disc drive it is possible that certain discs on a certain speed are not written properly when used with the write strategy information as retrieved from the disc.

WO2006097873A2 describes an apparatus and a corresponding method for determining write strategy parameters for recording data on an optical record carrier. The apparatus is proposed in WO2006097873A2 comprises:

initialization means for setting initial write strategy parameters, setting means for setting initial variable levels and an initial experimental plan, based on variations of said initial write strategy parameters, for use in a design of experiments method for optimization of said write strategy parameters, optimization means for determining optimized write strategy parameters by use of a design of experiments method, and iteration means for checking if, based on a predetermined criterion, the optimized write strategy parameters determined by the optimization means shall be further optimized and, in case the write strategy parameters shall be further optimized, for determining new variable levels and a new experimental plan for use in another iteration of the design of experiments method for further optimization of said write strategy parameters.

The optimization means of WO2006097873A2 may comprise:

test recording means for performing test recordings on said record carrier a predetermined number of times using variations of said initial write strategy parameters as set in the variable levels and the experimental plan used by the design of experiments method, measurement means for measuring a quality parameter value of a quality parameter for each test recording indicating the recording quality of said test recording, and determination means for determining optimized write strategy parameters by evaluation of the measured quality parameter values for said test recordings.

The determination means WO2006097873A2 may be adapted for determining the optimized parameters by use of a model, in particular a second-order model, and by determining an optimum, in particular a minimum, of said model.

The method described in WO2006097873A2 may work well when the write strategy has a relatively limited number of parameters. However, many standard write strategies associated with optical disk standard comprise a large number of independent parameters in the description of the standard write strategy as standardized. Especially for high-density recording systems using blue lasers to achieve a small spot size on the optical disk, the number of write strategy parameters is large. For example, in the BD-R and BD-RE standard, the number of write strategy parameters is large, e.g., 34 (4 power levels and 30 timing parameters) for a BD-R castle type write strategy and 49 (4 power levels and 45 timing parameters) for a BD-RE N−1 pulsed type write strategy, and their values need to be accurately applied. This may cause the method of WO2006097873A2 for determining write strategy parameters to take a larger amount of time than is acceptable.

Moreover, the high-density recording systems with blue lasers, like BD-R and BD-RE, and also HD-DVD systems, require a even more precisely controlled write strategy than the earlier lower-density red laser-based DVD systems. In effect, convergence to precise and robust write strategy parameters may be hampered when using the method of WO2006097873A2 without any further measure.

Also the use of a second-order model for determining optimized parameters as described in WO2006097873A2 may fail or result in a erroneous results, e.g., due to a misconvergence, when used without any further measure.

SUMMARY

The present invention aims to provide an improved apparatus and an improved method for determining write strategy parameter values, which can be easily implemented in practice, requires only a short amount of time and/or allows for determination of optimal write strategy parameter values, especially for blue laser-based optical discs for which write strategies with a large number of parameters are standardized.

Hereto the present invention provides a method for determining write strategy parameter values for writing data on an optical disk from a group of optical disks of different types using an optical disk drive, comprising:

identifying the type of optical disk using the optical disk drive, the type of optical disk associated with a standard write strategy with standard write strategy parameters, determining a cluster write strategy with cluster write strategy parameters, the number of cluster write strategy parameters being smaller than the number of standard write strategy parameters, initializing the cluster write strategy parameters with initial cluster write strategy parameter values.

With this method, a cluster write strategy with cluster write strategy parameters associated with the type of the optical disk is obtained, and the cluster write strategy parameters are initialized with initial cluster write strategy parameter values. The cluster write strategy may e.g. be used for writing data on the optical disk using the optical disk drive. The cluster write strategy parameter values may also be optimized further before they are applied.

Identifying the type of optical disk may comprise recognizing the optical disk to be of a CD class, a DVD class, a HD-DVD class, a BD disk class or another known class. Identifying may further comprise determining the specific standard type within one of those classes, e.g., a BD disk according to the BD Physical Standard writable at a 4× speed, a so-called BD-R 4× disk. Determining the specific standard type may comprise retrieving disk information data from the disk, e.g., reading information that is stored according to a standardized protocol in the wobble in the lead-in or lead-out area of the disk. The disk information generally comprises not only information about the type of optical disk, e.g., a BD-R 4× disk or a BD-RE 4× disk, but also a corresponding standard write strategy with standard write strategy parameters. Standard write strategy parameter values are also comprised in the disk information data, and may be retrieved from the disk.

Determining a cluster write strategy with cluster write strategy parameters is based on the recognized type. The cluster write strategy may, e.g., be retrieved from a pre-loaded cluster write strategy table stored in the drive, with the pre-loaded cluster write strategy table comprising a plurality of cluster write strategies with cluster write strategy parameters for different types of optical disks. Alternatively, the cluster write strategy may, e.g., be derived by the drive from the standard write strategy, e.g., by ignoring or equating some of the standard parameters.

Initializing the cluster write strategy parameter values may be performed by retrieving cluster write strategy parameter values from a parameter table stored in the drive comprising default values for power level parameters and pulse timing parameters. Such a parameter table may comprise general default values for initializing any type of disk within a class or within a group of types, e.g., general default values for any BD-R disk. Such a parameter table may alternatively comprise a plurality of initial values for a plurality of cluster write strategies in the parameter table. The parameter table may be pre-loaded in the drive. The values of the parameters in the parameter table may also be updated by the drive when the drive has optimized the parameter values.

Alternatively, initializing the cluster write strategy parameter values may e.g. be derived by the drive from the standard write strategy values, e.g., by reading all, or a subset of, standard write strategy values from the optical disk and transforming some of the standard write strategy parameter values to related cluster write strategy parameters. The transforming may, e.g., include nullifying a derived parameter value, or copying a standard write strategy parameter value related to a pulse sequence for writing a specific, such as a long, mark to a cluster write strategy parameter value for a pulse sequence for writing any type of mark, such as long marks as well as short marks.

Alternatively, initializing the cluster write strategy parameter values may e.g. be performed by reading cluster write strategy parameter values from the optical disk, when the optical disk comprises cluster write strategy parameter values. This situation may occur when the optical disk has been written using a cluster write strategy at an earlier occasion, preferably with the same optical disk drive, and when also the cluster write strategy parameter values were written to the optical disk at that occasion.

The method according to the invention may further comprise optimizing cluster write strategy parameter values for at least a subset of the cluster write strategy parameters.

Optimizing at least part of the cluster write strategy parameter values may be required to achieve a sufficient quality of data written to the disk using the cluster write strategy. Optimizing may also be performed to enhance the quality of written data, when data is written to the disk using the cluster write strategy, e.g., to improve readout margins or to enhance the robustness during writing. It may be sufficient to optimize a subset of the cluster write strategy parameters, e.g., just one power level parameter and one timing parameter.

In further embodiments of the method according to the invention, the cluster write strategy parameters have been organized in optimization sets of subsets of cluster write strategy parameters, the optimizing is performed on optimization sets of cluster write strategy parameters.

By optimizing the cluster write strategy parameters values in optimization sets, the time required for optimization and disk space required for optimization may be optimized. When the cluster write strategy parameters values would be optimized one-by-one, the time required for optimization may still be too long: the cluster write strategy may still have a considerable number of parameters, even though their number is small than the number of the standard write strategy parameters associated with the disk type of the optical disk.

The optimization sets are preferably organized such that each of them comprises a subset of cluster write strategy parameters which can be well optimized jointly. The optimization sets are preferably organized for a high sensitivity to varying the parameter values of the parameter combinations within the set.

Optimizing cluster write strategy parameter values is preferably performed in a pre-determined optimization order.

The pre-determined optimization order may be selected so as to achieve the fast convergence. The quality value generally has a different sensitivity to variations of write strategy parameter values. Write strategy parameter values corresponding to a high sensitivity are preferably optimized first, and write strategy parameter values corresponding to a low sensitivity are preferably optimized later.

Optimizing on the optimization set may comprise:

determining a plurality of cluster write strategy parameter test values of the cluster write strategy parameters in the optimization set, determining a plurality of quality values of a quality parameter of test data written on the optical disk using the optical disk drive with the plurality of cluster write strategy parameter test values, indicating a recording quality of the written data sequence, determining optimal values of the cluster write strategy parameter values of the cluster write strategy parameters in the optimization set from the plurality of quality values, the optimal values of the cluster write strategy parameter values being determined by the cluster write strategy parameter test values at which the quality parameter shows an optimum.

The optimization thus provides cluster write strategy parameter values which result in an optimum quality of data written on the optical disk when the cluster write strategy is applied for writing the data.

The quality value is preferably a jitter value with the optimum being the lowest jitter. The quality value may alternatively be e.g. a modulation depth value, a signal-to-noise ratio, an asymmetry value, a PRSNR, an error rate or any other data quality measure known to a person skilled in the art.

Determining a quality value may comprise acquiring one or more measurement values and processing the measurement values to determine a single quality value. Processing may comprise a statistical operation on a distribution of measurement values or on a distribution a plurality of intermediate quality values, such as determining an average or a standard deviation of such a distribution.

The optimizing of the cluster write strategy parameter values may comprise:

determining the optimum of the quality parameter, testing the optimum of the quality parameter against a pre-determined threshold, and optimizing cluster write strategy parameter values in the pre-determined optimization order may be stopped once the optimum of the quality parameter exceeds the pre-determined threshold.

Testing against the pre-determined threshold may e.g., comprises testing against an upper bound, testing against a lower bound, testing to be within a range or testing to be outside a range.

Optimizing may e.g. be stopped once the jitter is below 10%, as further optimization will only require more time and disk space, while the possible further improvement of the quality level is not of substantial practical value.

In a preferred embodiment, the optimization set comprises two cluster write strategy parameters and the two cluster write strategy parameters are jointly optimized.

The joint optimization may comprise applying a two-dimensional fit to the determined plurality of quality parameter values as a function of the plurality of two cluster write strategy parameter test values.

The fit procedure as described in WO2006097873A2 may e.g. be used for applying the two-dimensional fit.

In further embodiments of the method according to the invention, the cluster write strategy is associated with a plurality of pulse sequences, at least a subset of the pulse sequences comprise at least a start section, a middle section and an end section, the plurality of optimization sets comprises at least:

a first optimization set of cluster write strategy parameter values relating to the middle section, and a second optimization set of cluster write strategy parameter values relating to one of the group of the start section and the end section, and wherein the pre-determined optimization order is such that the optimization of the second optimization set is performed after the optimization of the first optimization set.

Each of the plurality of pulse sequences typically corresponds to a pulse sequence for writing a mark of a specific run length.

The quality level of written data has been found to be very sensitive to the value of cluster write strategy parameters relating to the middle section. By first optimizing cluster write strategy parameters relating to the middle section, a major improvement of the achievable quality level is thus generally rapidly achieved.

Optimizing parameters sets of different sections of the pulse sequences has the further advantage that the different optimizations may behave rather orthogonal: optimizing well-selected parameters relating to the middle section has generally little influence on optimizing parameters relating to the start section, and optimizing well-selected parameters relating to the middle section has generally little influence on optimizing parameters relating to the end section.

Further optimizations may be performed on parameters in further optimization sets in between or after the optimization of the first and the second optimization sets. The further optimisation sets may comprise cluster write strategy parameters selected from cluster write strategy parameters relating to the middle, start or end section. Cluster write strategy parameters in a further optimisation set may relate to different sections.

Optimization of the first optimization set may be preceded by an initial single-parameters optimal power calibration (OPC). The OPC is a procedure familiar to a person skilled in the art, and comprises an initial optimization of the overall power level using a single power factor applied to all power level value associated with the write strategy.

The plurality of optimization sets may further comprise:

a third optimization set of cluster write strategy parameter values relating to the other of the group of the start section and the end section, and the pre-determined optimization order is such that the optimization of the second optimization set is performed after the optimization of the first optimization set, and optimization of the third optimization set is performed after the optimization of the second optimization set.

This optimizes parameters in a rather independent manner. Optimizing well-selected parameters relating to the start section has generally little influence on optimizing parameters relating to the end section.

Further optimizations may be performed in further optimization sets in between the optimization of the second and the third optimization sets.

In further embodiments, the second optimization set of cluster write strategy parameter values relates to the start section, and the third optimization set of cluster write strategy parameter values relates to the end section.

The resulting optimization order of a first set of cluster write strategy parameter values relating to the middle section, then a second set of cluster write strategy parameter values relating to the start section, then a third set of cluster write strategy parameter values relating to the end section may be advantageously applied for a wide range of disk types and write strategies.

In embodiments of the method of the invention, the cluster write strategy is associated with at least a first sequence of pulses at a write power (Pw), the first sequence of pulses comprising at least one or more multipulse pulses parametrized with at least a multipulse pulse length (Tmp), wherein the write power (Pw) and the multipulse pulse length (Tmp) are jointly optimized.

Such a first sequence of pulses may be applied for writing long marks, e.g., so-called 4T marks corresponding a length of four times a data clock period T, and longer marks, on a BD-R or BD-RE disk.

The write power Pw and multipulse pulse length Tmp are associated with heating and cooling a recording layer on the optical disk, in order to write marks of a well-defined shape. The method thus provides a joint optimization of Pw and Tmp.

In embodiments of the method of the invention, the cluster write strategy is associated with at least:

a first sequence of pulses, the first sequence of pulses comprising a first start pulse, and a second sequence comprising a second start pulse, wherein the first start pulse is parametrized with at least a first start pulse length (Ttop) and a first start pulse delay (dTtop), the second start pulse is parametrized with at least the first start pulse length (Ttop), the first start pulse delay (dTtop), a first start pulse length correction ($\Delta$Ttop_2T) and a first start pulse delay correction ($\Delta$dTtop_2T), and wherein two parameters selected from the group of the first start pulse length (Ttop), the first start pulse length correction ($\Delta$Ttop_2T), the first start pulse delay (dTtop) and the first start pulse delay correction ($\Delta$dTtop_2T), are jointly optimized.

Such a first sequence of pulses may be applied for writing long marks, e.g., of a length of four times a data clock period or longer. The first start pulse length (Ttop) and the first start pulse delay (dTtop) are especially associated with writing the beginning of such a long mark.

The second sequence of a second start pulse may be applied for writing a short mark, e.g., a mark a length of the minimum run length of a data modulation scheme, such as a mark of two times a data clock period for NRZI coding of a so-called d=1 RLL code, as is know to a person skilled in the art. The first start pulse length correction ($\Delta$Ttop_2T) and the second start pulse delay correction ($\Delta$dTtop_2T) are especially associated with corrections applied when writing the beginning of such a short mark compared to writing a long mark.

The method thus provides a joint optimization of two parameters associated with the start section of pulse sequences. Examples are joint optimization of, e.g., the first start pulse delay (dTtop) and the first start pulse delay correction ($\Delta$dTtop_2T), the first start pulse delay (dTtop) and the first start pulse length correction (dTtop_2T), the first start pulse length (Ttop) and the first start pulse length correction ($\Delta$dTtop_2T), or the first start pulse length (Ttop) and the first start pulse length correction ($\Delta$Ttop_2T).

In embodiments of the method of the invention, the cluster write strategy is associated with at least:

a first sequence of pulses, the first sequence of pulses comprising a first start pulse, and a second sequence comprising a second start pulse, wherein the first start pulse is parametrized with at least a first start pulse delay (dTtop), the second start pulse is parametrized with at least the first start pulse delay (dTtop) and a first start pulse delay correction ($\Delta$dTtop_2T), and wherein the first start pulse delay (dTtop) and the first start pulse delay correction ($\Delta$dTtop_2T) are jointly optimized.

The method thus provides a joint optimization of two parameters associated with the start section of pulse sequences, and in particular associated with the associated timing.

In embodiments of the method of the invention, the cluster write strategy is associated with at least:

a first sequence of pulses, the first sequence of pulses comprising a first start pulse, and a second sequence comprising a second start pulse, wherein the first start pulse is parametrized with at least a first start pulse length (Ttop), the second start pulse is parametrized with at least the first start pulse length (Ttop) and a first start pulse length correction ($\Delta$Ttop_2T), and wherein the first start pulse length (Ttop) and the first start pulse length correction ($\Delta$Ttop_2T) are jointly optimized.

The method thus provides a joint optimization of two parameters associated with the start section of pulse sequences, and in particular associated with the associated pulse length for writing the marks.

In embodiments of the method of the invention, the cluster write strategy is associated with at least:

a space sequence parametrized with at least a space power factor ($\epsilon$_Ps) and a space delay (dTs), and wherein the space power ($\epsilon$_Ps) and the space delay (dTs) are jointly optimized.

In order to obtain spaces in between the marks, and have a well-defined end of the mark, hence a well-defined positioning of the space, the space power is applied with a well-defined timing, denoted by the space delay.

The method thus provides a joint optimization of two parameters associated with the end section of pulse sequences, and in particular associated with the timing and power level associated with the spaces.

In embodiments of the method of the invention, first a joint optimization is performed of the write power (Pw) and the multipulse pulse length (Tmp) as described above, and then at least one joint optimization is performed selected from the group of:

a) a joint optimization of two parameters selected from the group of the first start pulse length (Ttop), the first start pulse length correction ($\Delta$Ttop_2T), the first start pulse delay (dTtop) and the first start pulse delay correction ($\Delta$dTtop_2T), b) a joint optimization of the first start pulse delay (dTtop) and the first start pulse delay correction ($\Delta$dTtop_2T), c) a joint optimization of the first start pulse length (Ttop) and the first start pulse length correction ($\Delta$Ttop_2T), and d) a joint optimization of the space power ($\epsilon$_Ps) and the space delay (dTs).

The method thus provides a first joint optimization of two parameters associated with the middle section of pulse sequences and then a joint optimization of two parameters associated with either the start section or the end section.

In further embodiments of the method of the invention, first a joint optimization is performed of the write power (Pw) and the multipulse pulse length (Tmp) as described above, then one joint optimization is performed selected from the group of:

1a) a joint optimization of the first start pulse delay (dTtop) and the first start pulse delay correction ($\Delta$dTtop_2T), and 1b) a joint optimization of the first start pulse length (Ttop) and the first start pulse length correction ($\Delta$Ttop_2T), then the other joint optimization is performed selected from the group of:

1a) a joint optimization of the first start pulse delay (dTtop) and the first start pulse delay correction ($\Delta$dTtop_2T), and 1b) a joint optimization of the first start pulse length (Ttop) and the first start pulse length correction ($\Delta$Ttop_2T).

The method thus provides a first joint optimization of two parameters associated with the middle section of pulse sequences and then an optimization stage comprising two subsequent joint optimizations of two parameters associated with the start section.

In embodiments of the method of the invention, first a joint optimization is performed of the write power (Pw) and the multipulse pulse length (Tmp) as described above, and then at least one joint optimization is performed selected from the group of:

a) a joint optimization of two parameters selected from the group of the first start pulse length (Ttop), the first start pulse length correction ($\Delta$Ttop_2T), the first start pulse delay (dTtop) and the first start pulse delay correction ($\Delta$dTtop_2T), b) a joint optimization of the first start pulse delay (dTtop) and the first start pulse delay correction (ΔdTtop_2T), and c) a joint optimization of the first start pulse length (Ttop) and the first start pulse length correction (ΔTtop_2T), and then a joint optimization is performed of the space power (ε_Ps) and the space delay (dTs).

The method thus provides first a joint optimization of two parameters associated with the middle section of pulse sequences, then a joint optimization of two parameters associated with the start section, and then a joint optimization of two parameters associated with the end section.

In further embodiments of the method of the invention, first a joint optimization is performed of the write power (Pw) and the multipulse pulse length (Tmp) as described above, then one joint optimization is performed selected from the group of:

1a) a joint optimization of the first start pulse delay (dTtop) and the first start pulse delay correction (ΔdTtop_2T), and 1b) a joint optimization of the first start pulse length (Ttop) and the first start pulse length correction (ΔTtop_2T), then the other joint optimization is performed selected from the group of:

1a) a joint optimization of the first start pulse delay (dTtop) and the first start pulse delay correction (ΔdTtop_2T), and 1b) a joint optimization of the first start pulse length (Ttop) and the first start pulse length correction (ΔTtop_2T), and then a joint optimization is performed of the space power (ε_Ps) and the space delay (dTs).

The method thus provides a first joint optimization of two parameters associated with the middle section of pulse sequences, then an optimization stage comprising two joint optimizations of two parameters associated with the start section, and then a joint optimization of two parameters associated with the end section.

In alternative embodiments of the method of the invention, the cluster write strategy is associated with at least:

a first shaped pulse comprising a sequence of pulses, the sequence of pulses comprising a first start pulse parametrized with at least a first write power (Pw1), a first following pulse at a second write power (Pw2) immediately adjacent to the first start pulse and parametrized with at least a second write power factor (ε_Pw2), and a first end pulse at the first write power (Pw1) immediately adjacent to the first following pulse and parametrized with at least the first write power (Pw1), a first cooling period immediately adjacent to the first end pulse and parametrized with at least a first cooling delay (dTc_4T) denoting the delay of the first cooling period, and wherein the second write power factor (ε_Pw2) and the first cooling delay (dTc_4T) are jointly optimized.

Such a first shaped pulse may be applied for writing long marks, e.g., of a length of four times a data clock period or longer, on e.g., a BD-R disk. The first write power Pw1 and the second write power Pw2 are associated with the middle section of the pulse sequence, and are associated with heating a recording layer on the optical disk.

The first cooling delay is associated with the time delay dTc_4T of the transition of the first shaped pulse to the cooling period.

The second write power Pw2 and the time delay dTc_4T thus relate to the middle section of the pulse sequence for such a first shaped pulse. In first order approximation they determine the delivery of the energy content of the shaped pulse. The method thus provides a joint optimization of ε_Pw2 and dTc_4T.

In embodiments of the method of the invention, the cluster write strategy is associated with at least:

a first shaped pulse comprising a sequence of pulses, the sequence of pulses comprising a first start pulse at a first write power (Pw1) and parametrized with at least a first start pulse delay (dTtop_4T), a first following pulse at a second write power (Pw2) immediately adjacent to the first start pulse and a first end pulse at the first write power (Pw1) immediately adjacent to the first following pulse, a second shaped pulse comprising a first start pulse parametrized with at least a second start pulse length (Ttop_2T) and a second start pulse delay (dTtop_2T), and a third shaped pulse comprising a sequence of pulses, the sequence of pulses comprising a third start pulse at the first write power (Pw1) and parametrized with at least a third start pulse length (Ttop_3T), and a second following pulse at the second write power (Pw2) immediately adjacent to the second start pulse, and wherein two parameters selected from the group of the second start pulse length (Ttop_2T), the third start pulse length (Ttop_3T), the first start pulse delay (dTtop_4T) and second start pulse delay (dTtop_2T) are jointly optimized.

Such a first shaped pulse may be applied for writing long marks, e.g. a mark with a length corresponding to four times a data clock period (4T) or longer, on e.g., a BD-R disk. The first start pulse delay (dTtop_4T) is especially associated with writing the beginning of such a long mark.

The second shaped pulse may be applied for writing a short mark, e.g. a mark with a length of the minimum run length of a data modulation scheme, such as a so-called 2T-mark with a length corresponding to two times a data clock period for NRZI coding of a so-called d=1 RLL code, as is know to a person skilled in the art. The second start pulse length (Ttop_2T) and second start pulse delay (dTtop_2T) are especially associated with the effective power in such a shaped pulse and the beginning of such a short mark compared to writing a long mark.

The third shaped pulse may be applied for writing another mark, e.g., a mark with the length of the minimum run length of a data modulation scheme plus a length corresponding to an additional data clock period, such as a so-called 3T-mark with a length corresponding to three times a data clock period for NRZI coding of a so-called d=1 RLL code, as is know to a person skilled in the art. The third start pulse length (Ttop_3T) is especially associated with the effective power in the start of such a shaped pulse.

The method thus provides a joint optimization of two parameters associated with the start section of the pulse sequence. Examples are joint optimization of, e.g., the first start pulse delay (dTtop_4T) and the second start pulse delay (dTtop_2T), the first start pulse delay (dTtop_4T) and the second start pulse length (Ttop_2T), the first start pulse delay (dTtop_4T) and the third start pulse length (Ttop_3T), or the second start pulse length (Ttop_2T) and the third start pulse length (Ttop_3T).

In embodiments of the method of the invention, the cluster write strategy is associated with at least:

a first shaped pulse comprising a sequence of pulses, the sequence of pulses comprising a first start pulse at a first write power (Pw1) and parametrized with at least a first start pulse delay (dTtop_4T), a first following pulse at a second write power (Pw2) immediately adjacent to the first start pulse and a first end pulse at the first write power (Pw1) immediately adjacent to the first following pulse, and
a second shaped pulse comprising a first start pulse parametrized with at least a second start pulse delay (dTtop_2T), and wherein
the first start pulse delay (dTtop_4T) and the second start pulse delay (dTtop_2T) are jointly optimized.

The method thus provides a joint optimization of two parameters associated with the start section of the pulse sequences for writing short, 2T, marks and long marks.

In embodiments of the method of the invention, the cluster write strategy is associated with at least:
a second shaped pulse comprising a first start pulse parametrized with at least a second start pulse length (Ttop_2T), and
a third shaped pulse comprising a sequence of pulses, the sequence of pulses comprising a third start pulse at the first write power (Pw1) and parametrized with at least a third start pulse length (Ttop_3T), and a second following pulse at the second write power (Pw2) immediately adjacent to the second start pulse, and wherein
the second start pulse length (Ttop_2T) and the third start pulse length (Ttop_3T) are jointly optimized.

The method thus provides a joint optimization of two parameters associated with the start section of the pulse sequences, in particular the length of the start pulses for writing a 2T and a 3T mark.

In embodiments of the method of the invention, the cluster write strategy is associated with at least:
a third shaped pulse comprising a sequence of pulses, the sequence of pulses comprising a third start pulse at the first write power (Pw1) and parametrized with at least a third start pulse length (Ttop_3T), and a second following pulse at the second write power (Pw2) immediately adjacent to the second start pulse,
a third cooling period immediately adjacent to the second following pulse, parametrized with at least a third cooling delay (dTc_3T) denoting the delay of the third cooling period, and
a space sequence at a space power (Ps) parametrized with at least a space power factor ($\epsilon\_Ps$), and wherein
the space power factor ($\epsilon\_Ps$) and the third cooling delay (dTc_3T) are jointly optimized.

In order to obtain spaces in between the marks, and have a well-defined end of the mark, hence a well-defined positioning of the space, the space power is applied with a well-defined power and timing relative to the shaped pulse and relative to the cooling delay.

The method thus provides a further optimization of one parameter associated with the end of the marks and one parameter associated with the middle of the marks.

In embodiments of the method of the invention, the cluster write strategy is associated with at least:
a third shaped pulse comprising a sequence of pulses, the sequence of pulses comprising a third start pulse at the first write power (Pw1) and parametrized with at least a third start pulse delay (dTtop_3T), and a second following pulse at the second write power (Pw2) immediately adjacent to the second start pulse,
a third cooling period immediately adjacent to the second following pulse, parametrized with at least a cooling power factor ($\epsilon\_Pc$) denoting the power level during the third cooling period, and wherein
the third start pulse delay (dTtop_3T) and the third cooling power factor ($\epsilon\_Pc$) are jointly optimized.

The method thus provides a joint optimization of one parameter associated with the end of the marks, $\epsilon\_Pc$, and one parameter associated with the start of the 3T marks, dTtop_3T.

The joint optimization of $\epsilon\_Pc$ and dTtop_3T may be performed as a further optimization after the first, second and third optimization sets have been performed, or in between the optimization of the second and third optimization sets.

In embodiments of the method of the invention, first a joint optimization is performed of the second write power factor ($\epsilon\_Pw2$) and the first cooling delay (dTc_4T) as described above, and then at least one joint optimization is performed selected from the group of:
a) a joint optimization of the first start pulse delay (dTtop_4T) and the second start pulse delay (dTtop_2T), and
b) a joint optimization of the second start pulse length (Ttop_2T) and the third start pulse length (Ttop_3T).

The method thus provides first a joint optimization of two parameters associated with the middle section of the pulse sequences of the first shaped pulse, $\epsilon\_Pw2$ and dTc_4T, and then a joint optimization of two parameters associated with the start section of the pulse sequences of the first shaped pulse the second shaped pulse, dTtop_4T and dTtop_2T, or associated with the start section of the pulse sequences of the second shaped pulse and the third shaped pulse, Ttop_2T and Ttop_3T.

In further embodiments of the method of the invention, first a joint optimization is performed of the second write power factor ($\epsilon\_Pw2$) and the first cooling delay (dTc_4T) as described above, and then at least one joint optimization is performed selected from the group of:
a) a joint optimization of two parameters selected from the group of the second start pulse length (Ttop_2T), the third start pulse length (Ttop_3T), the first start pulse delay (dTtop_4T) and second start pulse delay (dTtop_2T)
b) a joint optimization of the first start pulse delay (dTtop_4T) and the second start pulse delay (dTtop_2T),
c) a joint optimization of the second start pulse length (Ttop_2T) and the third start pulse length (Ttop_3T),
d) a joint optimization of the space power factor ($\epsilon\_Ps$) and the third cooling delay (dTc_3T), and
e) a joint optimization of the third start pulse delay (dTtop_3T) and the third cooling power factor ($\epsilon\_Pc$).

The method thus provides first a joint optimization of two parameters associated with the middle section of pulse sequences and then a joint optimization of two parameters associated with the start section or a joint optimization of the parameters of a further optimization set.

In again further embodiments of the method of the invention, first a joint optimization is performed of the second write power factor ($\epsilon\_Pw2$) and the first cooling delay (dTc_4T) as described above, and then at least one joint optimization is performed selected from the group of:
1a) a joint optimization of two parameters selected from the group of the second start pulse length (Ttop_2T), the third start pulse length (Ttop_3T), the first start pulse delay (dTtop_4T) and second start pulse delay (dTtop_2T)
1b) a joint optimization of the first start pulse delay (dTtop_4T) and the second start pulse delay (dTtop_2T), and 1c) a joint optimization of the second start pulse length (Ttop_2T) and the third start pulse length (Ttop_3T), and then at least one joint optimization is performed selected from the group of:

2a) a joint optimization of the space power factor ($\epsilon$_Ps) and the third cooling delay (dTc_3T), and 2b) a joint optimization of the third start pulse delay (dTtop_3T) and the third cooling power factor ($\epsilon$_Pc).

The method thus provides first a joint optimization of two parameters associated with the middle section, then a joint optimization of two parameters associated with the start section and then a joint optimization of two parameters of a further optimization set.

In embodiments of the method of the invention, first a joint optimization is performed of the second write power factor ($\epsilon$_Pw2) and the first cooling delay (dTc_4T) as described above, and then one joint optimization is performed selected from the group of:

1a) a joint optimization of the first start pulse delay (dTtop_4T) and the second start pulse delay (dTtop_2T), and 1b) a joint optimization of the second start pulse length (Ttop_2T) and the third start pulse length (Ttop_3T), then the other joint optimization is preformed selected from the group of:

1a) the joint optimization of the first start pulse delay (dTtop_4T) and the second start pulse delay (dTtop_2T), and 1b) the joint optimization of the second start pulse length (Ttop_2T) and the third start pulse length (Ttop_3T).

The method thus provides first a joint optimization of two parameters associated with the middle section of the pulse sequences of the first shaped pulse, $\epsilon$_Pw2 and dTc_4T, and then, e.g., a joint optimization of two parameters associated with the start section of the pulse sequences of the first shaped pulse the second shaped pulse, dTtop_4T and dTtop_2T, followed by a joint optimization of two parameters associated with the start section of the pulse sequences of the second shaped pulse and the third shaped pulse, Ttop_2T and Ttop_3T.

In further embodiments of the method of the invention, first a joint optimization is performed of the second write power factor ($\epsilon$_Pw2) and the first cooling delay (dTc_4T) as described above, and then one joint optimization is performed selected from the group of:

1a) a joint optimization of the first start pulse delay (dTtop_4T) and the second start pulse delay (dTtop_2T), and 1b) a joint optimization of the second start pulse length (Ttop_2T) and the third start pulse length (Ttop_3T), then the other joint optimization is performed selected from the group of:

1a) the joint optimization of the first start pulse delay (dTtop_4T) and the second start pulse delay (dTtop_2T), and 1b) the joint optimization of the second start pulse length (Ttop_2T) and the third start pulse length (Ttop_3T), then one joint optimization is performed selected from the group of:

2a) a joint optimization of the space power factor ($\epsilon$_Ps) and the third cooling delay (dTc_3T), and 2b) a joint optimization of the third start pulse delay (dTtop_3T) and the third cooling power factor ($\epsilon$_Pc), and then the other joint optimization is performed selected from the group of:

2a) the joint optimization of the space power factor ($\epsilon$_Ps) and the third cooling delay (dTc_3T), and 2b) the joint optimization of the third start pulse delay (dTtop_3T) and the third cooling power factor ($\epsilon$_Pc).

The method thus provides first a joint optimization of two parameters associated with the middle section, then a joint optimization of two parameters associated with the start section, then a joint optimization of two other parameters associated with the start section, and then a joint optimization of parameters of a further optimization set.

Embodiments of the invention provide a method for determining a write strategy with write strategy parameters usable for writing data on an optical disk of an optical disk type with an optical disk drive, comprising:

determining a standard write strategy with standard write strategy parameters, the standard write strategy corresponding to the optical disk type, deriving a cluster write strategy with cluster write strategy parameters from the standard write strategy with standard write strategy parameters, the number of cluster write strategy parameters being smaller than the number of standard write strategy parameters.

The method may be applied to prepare a table comprising a plurality of cluster write strategies, e.g., for storage in a memory in an optical disk drive and for later retrieval by the optical disk drive upon detection of an optical disk of the optical disk type associated with the cluster write strategy thus derived. The table stored in the memory is also referred to as pre-loaded table.

The method may also be applied in an optical disk drive.

Embodiments of the invention provide a method for writing data on an optical disk with an optical disk drive using a write strategy, comprising one of the methods for determining write strategy parameter values as described above.

Embodiments of the invention provide an optical disk drive arranged to perform one of the methods described above.

Embodiments of the invention provide a computer program product arranged to be loaded in a processor and to perform one of the methods described above.

SHORT DESCRIPTION OF FIGURES

These and other aspects of the invention will be further elucidated and described in detail with reference to the drawings, in which corresponding reference symbols indicate corresponding parts:

FIG. 1a schematically shows the top-view of an optical disk;

Figure 2:
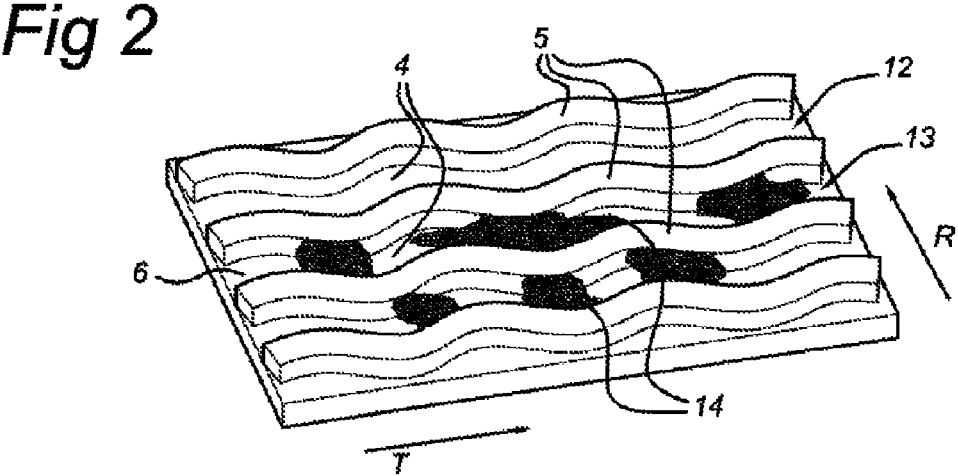
Figure 3:
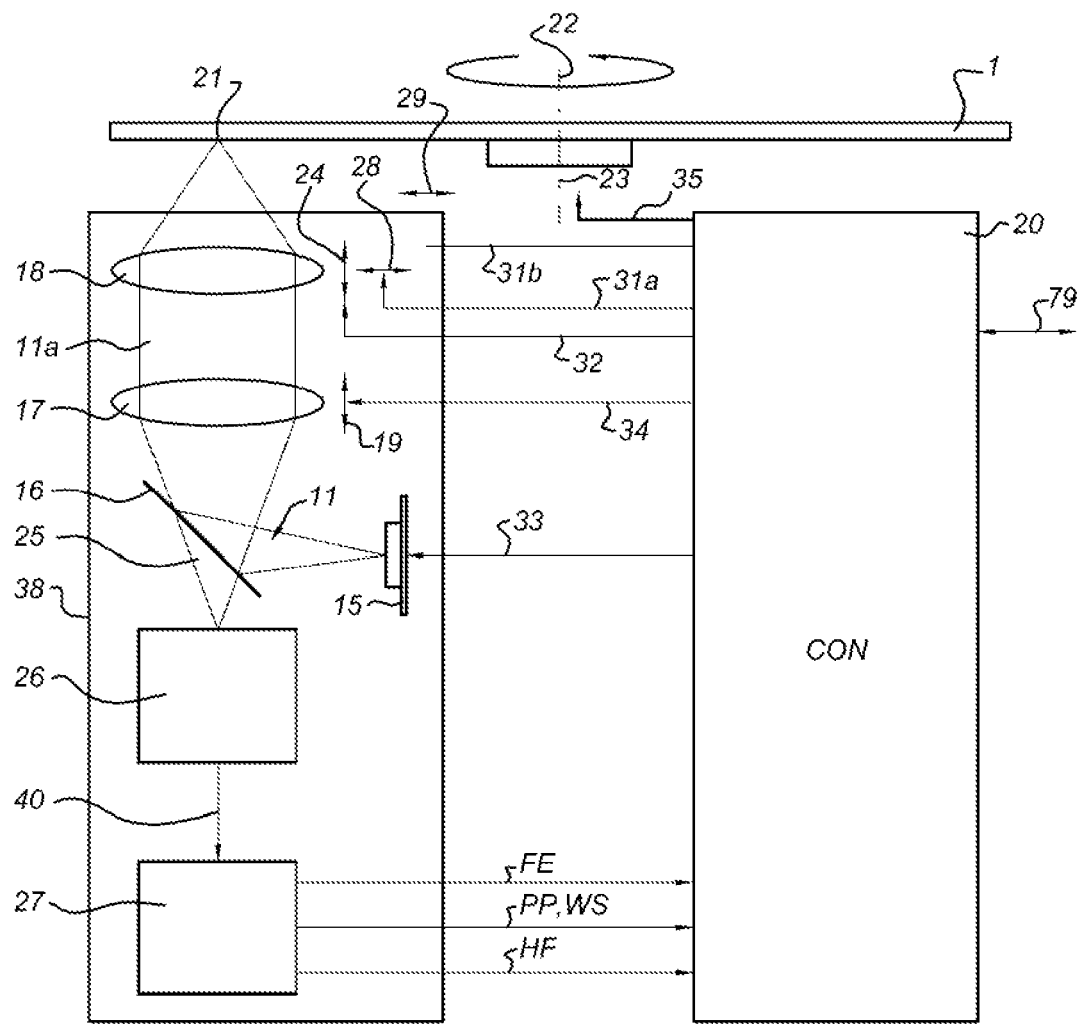
Figure 4:
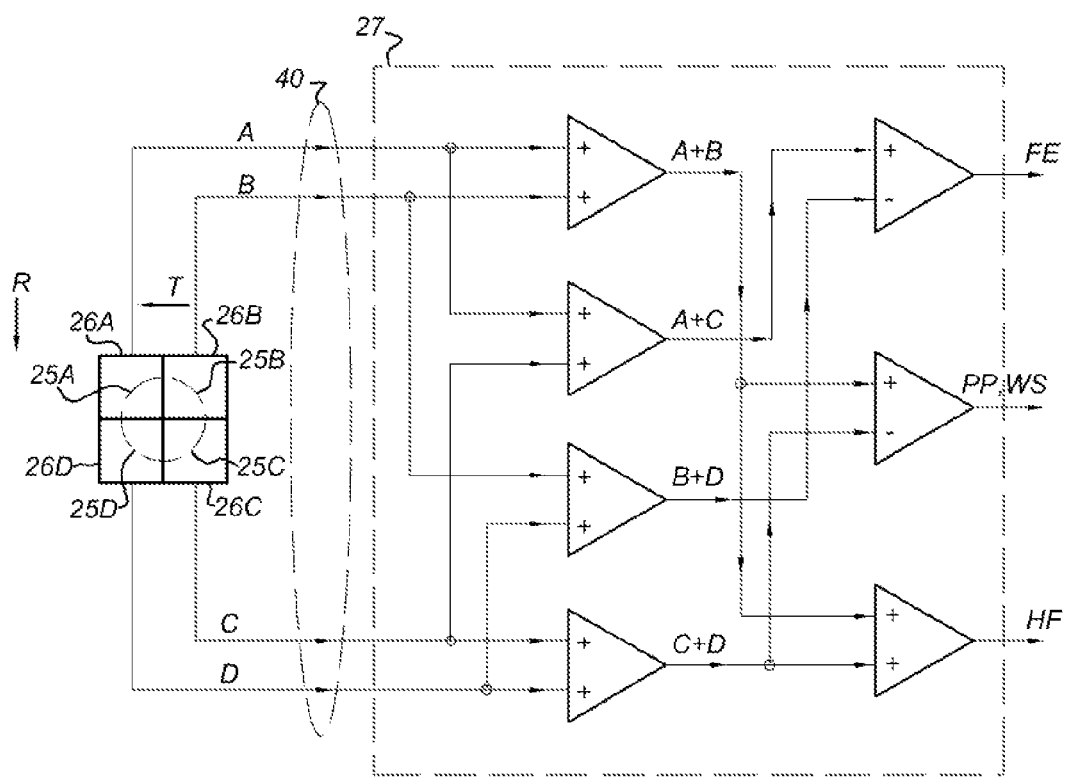
Figure 5:
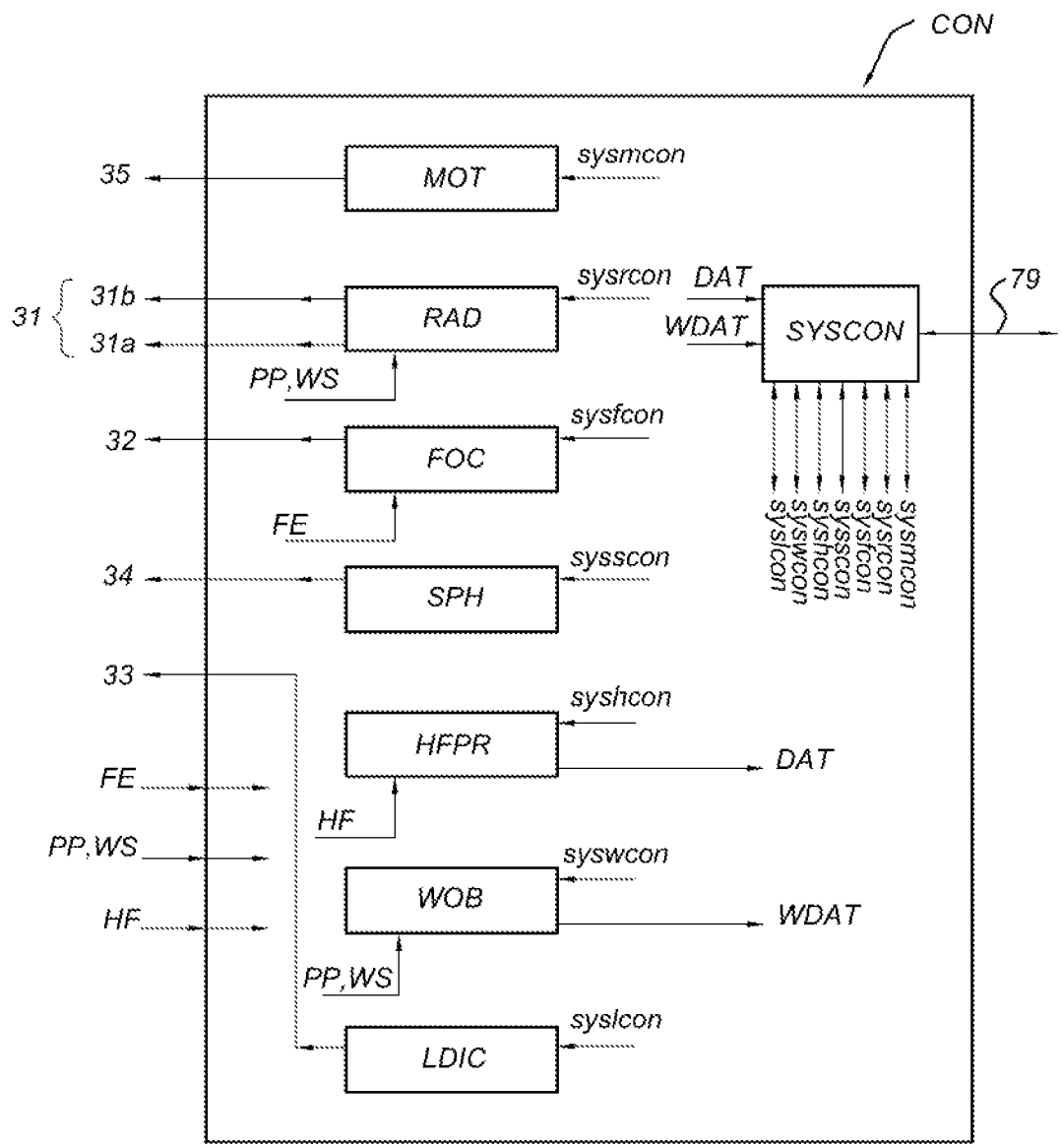
Figure 6:
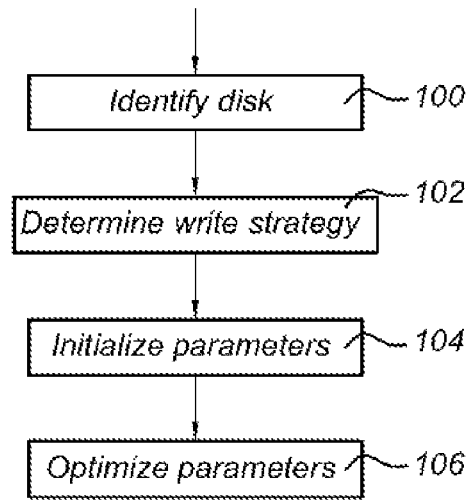
Figure 7:
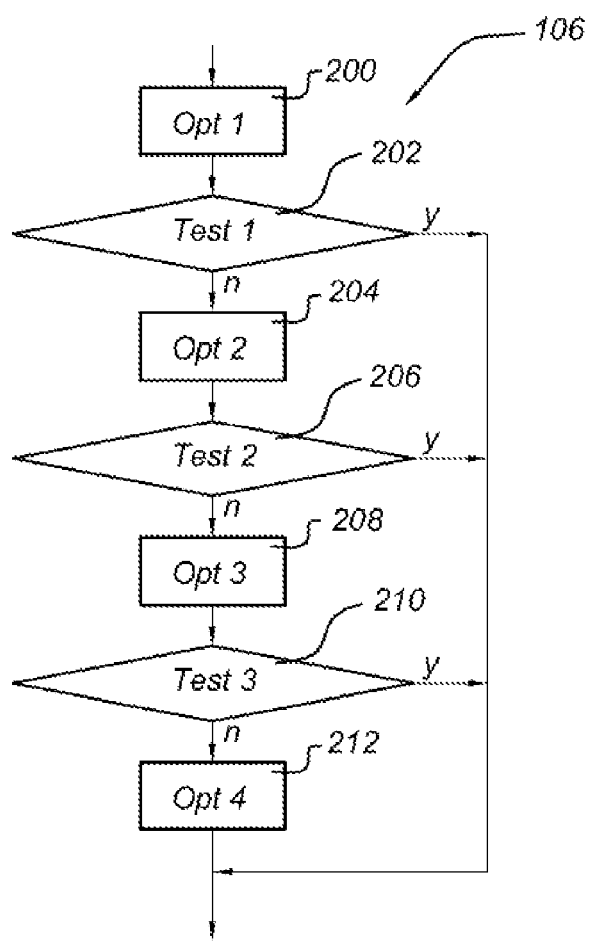
Figure 8:
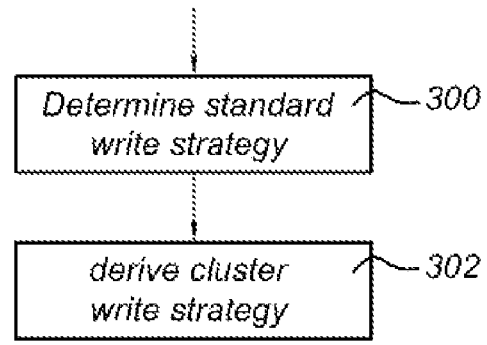
Figure 9:
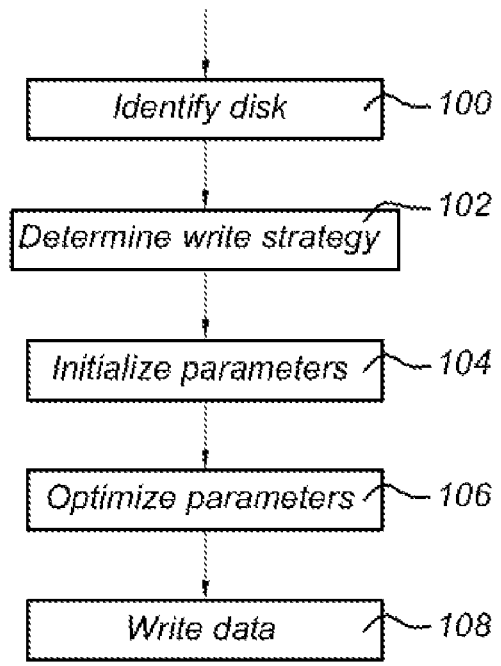
Figure 10:
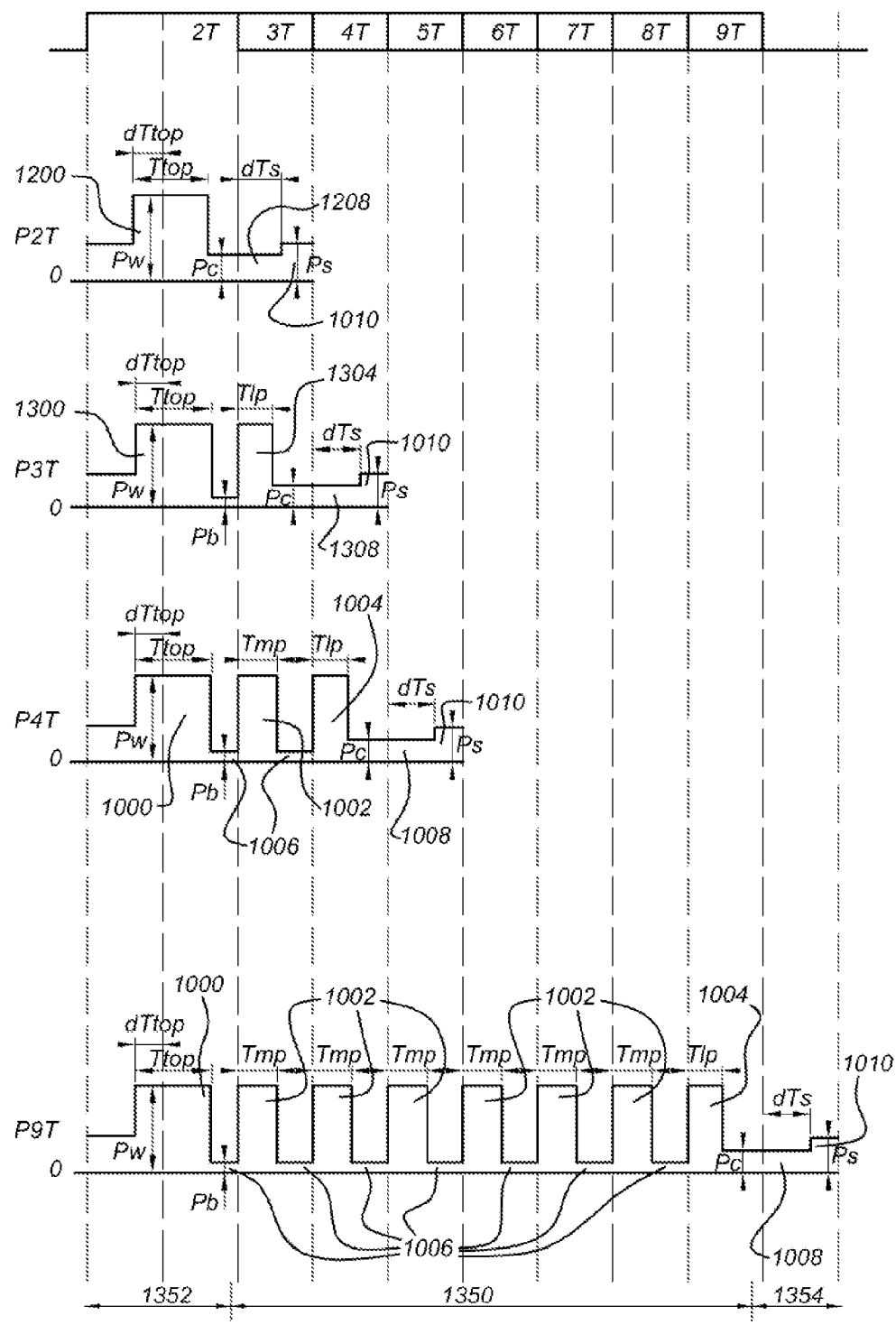
Figure 11A:
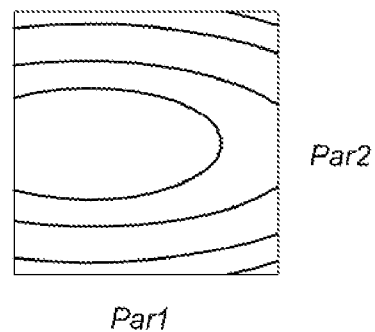
Figure 11B:
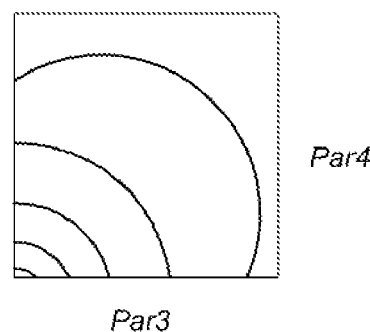
Figure 11C:
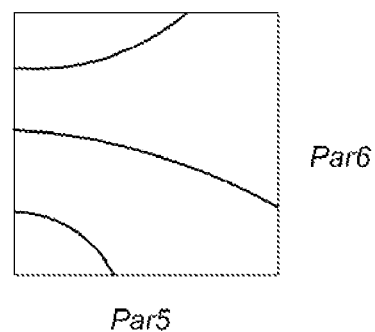
Figure 11D:
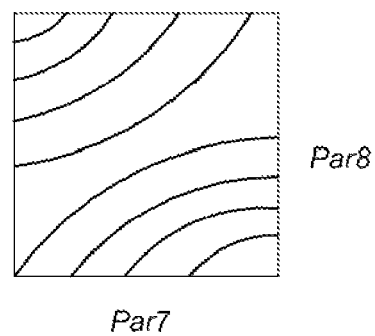
Figure 12:
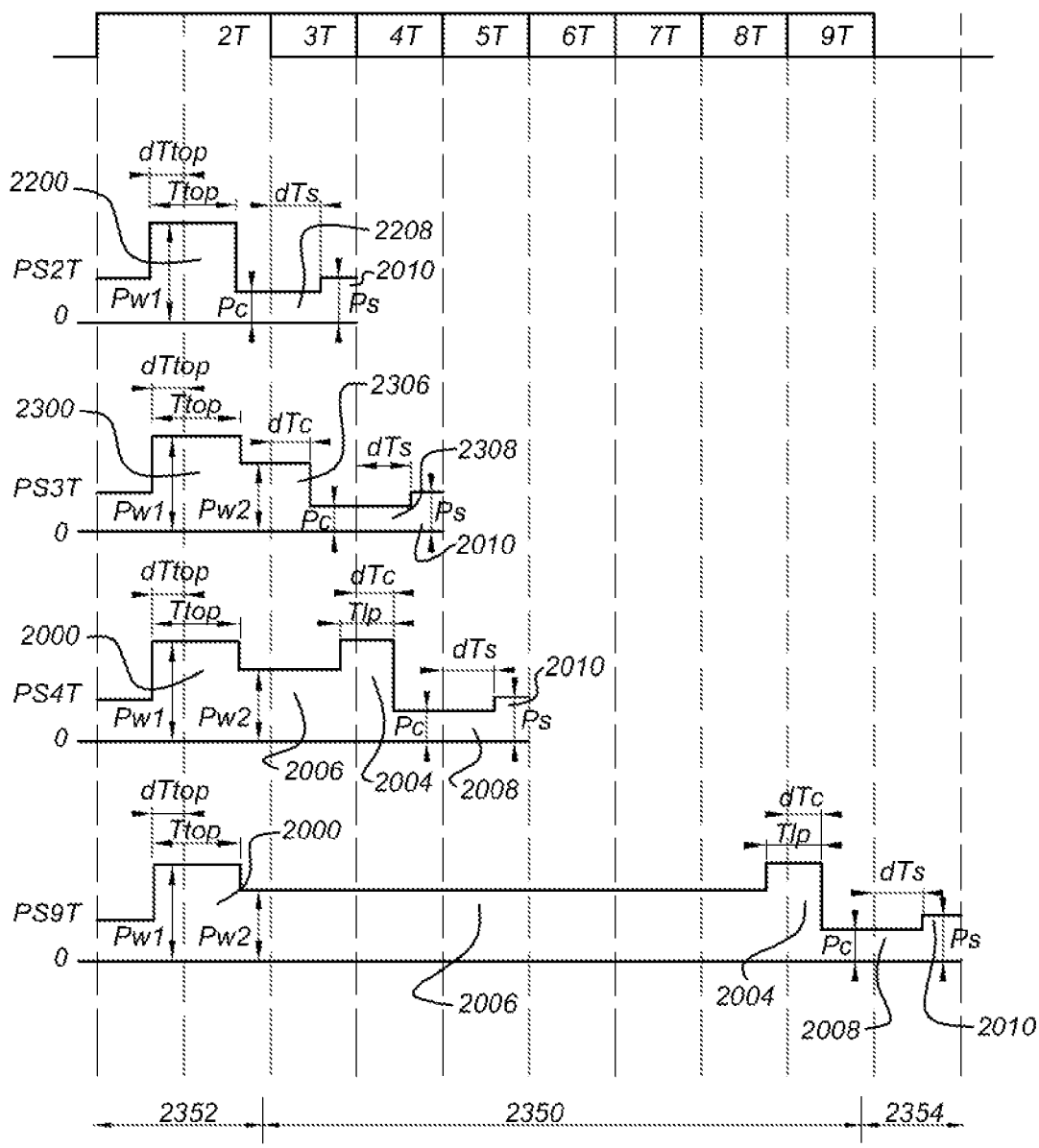
Figure 13:
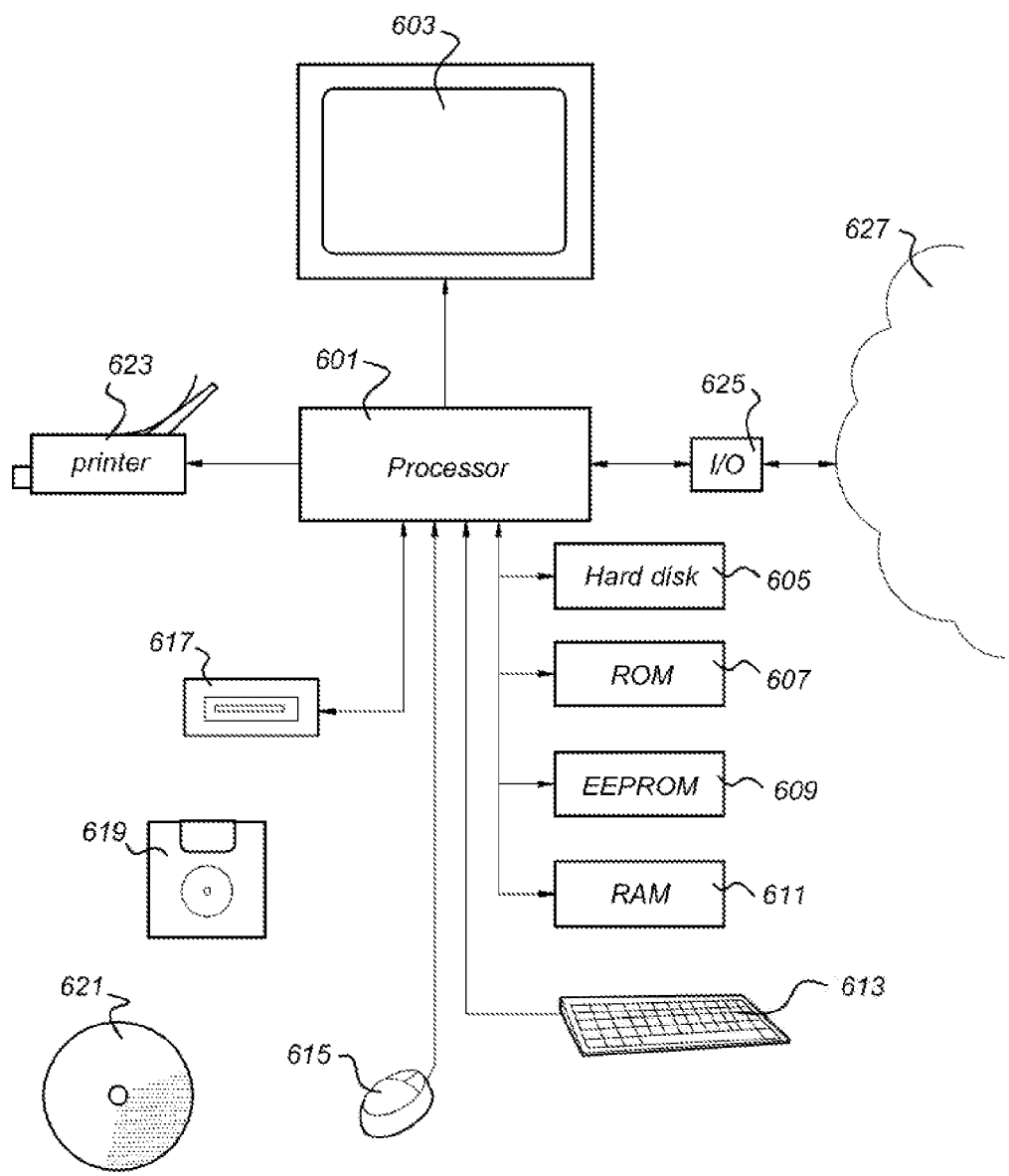

FIG. 2 schematically shows a wobbled groove and recorded information marks in the grooves on an optical disk;

FIG. 3 schematically shows an optical disk drive;

FIG. 4 schematically shows a signal processing unit of an optical disk drive;

FIG. 5 schematically shows a controller of an optical disk drive;

FIG. 6 schematically shows an embodiment of a method according to the invention;

FIG. 7 schematically shows an embodiment of an element of the embodiment of FIG. 6;

FIG. 8 schematically shows another embodiment of a method according to the invention;

FIG. 9 schematically shows another embodiment of a method according to the invention;

FIG. 10 schematically shows a so-called N−1 pulsed standard write strategy according to a standard for a BD disk;

FIG. 11a schematically shows a measurement of jitter as a function of two write strategy parameter values;

FIG. 11b schematically shows another measurement of jitter as a function of two write strategy parameter values;

FIG. 11c schematically shows again another measurement of jitter as a function of two write strategy parameter values;

FIG. 11d schematically shows again another measurement of jitter as a function of two write strategy parameter values;

FIG. 12 schematically shows a so-called castle standard write strategy according to a standard for a BD disk;

FIG. 13 shows an overview of a computer arrangement that can be used to carry out the method according to the invention.

DETAILED DESCRIPTION

Figure 1A:
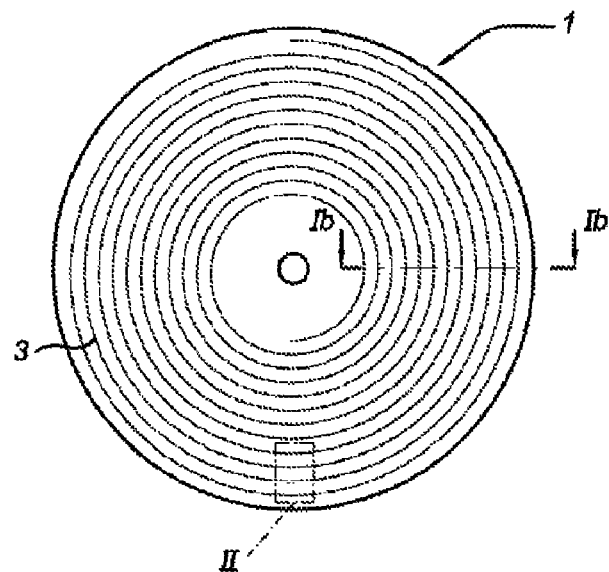
FIG. 1b shows a cross section an optical disk with one recording layer.
FIG. 1c shows a cross section an optical disk with two recording layers.
Figure 1B:
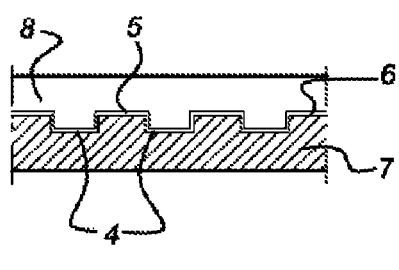
Figure 1C:
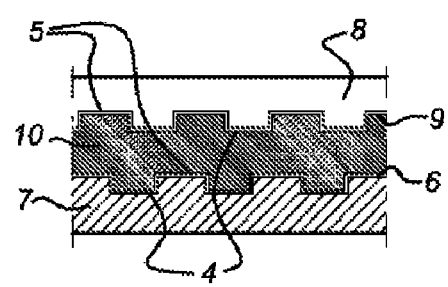

FIG. 1a-c show an optical disk 1 and FIG. 2 shows a detailed view of area II of the optical disk 1. The optical disk has a substantially circular, spiralling track 3. The track 3 is a groove 4 in a surrounding surface area 5, also called land. A recording layer 6 is deposited on the substrate 7. The recording layer is covered with a transparent cover layer 8. In a BluRay disk (BD), the transparent cover layer has a nominal thickness of 0.100 mm, and access of the tracks is done through this transparent cover layer. In a DVD disk, access is done through the substrate 7, which has a thickness of 0.6 mm.

A BluRay disk may alternatively comprise a flat substrate 7, with the track 3 being replicated in or on the cover layer 8 and the recording layer 6 being deposited in the cover layer 8. The cover layer 8 can, e.g., be a foil sheet, which is glued to the substrate 7.

The optical disk 1 may have a single recording layer 6 as shown in FIG. 1b. The optical disk 1 may also have multiple recording layers 6, 9, separated by a transparent spacer layer 10 as shown in FIG. 1c. In a BluRay disk, the spacer layer 10 usually has a thickness in the range of 0.020 mm-0.030 mm.

The disk is produced as a disk with empty tracks 12, as is shown in FIG. 2. The track can accommodate marks 14 which can be written on the track with an optical disk drive. The marks 14 are separated along the track by spaces. The marks can be erased and overwritten in, e.g., a rewritable BluRay disk (BD-RE disk), but can also be of a permanent nature as in a recordable BluRay disk (BD-R disk). The marks and spaces are of various lengths, and carry data information. These marks and spaces can be read out with an optical disk drive, as scanning along the track over these marks and spaces results in a modulation of light reflected on the disk, which is detected by the optical disk drive with a sensor.

As shown in FIG. 2, the track 3 may have a sinusoidal deviation from its nominal position into the radial direction R of the disk. This sinusoidal deviation is called the wobble. The wobble can be a fixed-frequency continuous sinusoidal for use as a time reference signal, e.g., to which the disk speed or a signal clock can be related, or a modulated sinusoidal encoding wobble data information, e.g., a frequency-modulated sinusoidal with a modulation around a centre frequency encoding or a phase-modulated sinusoidal with a modulation at a fixed frequency. Various standardized optical disk systems use the wobble for carrying information to classify the disk and the values of various parameters, e.g., the address of a specific location on the disk and write strategy parameter values. Disks according to the DVD+RW, BD-RE and BD-R standards have a phase-modulated wobble at a fixed spatial period measured along the track. Disks according to the DVD-RW standard have a frequency-modulated wobble.

The track 3 may also comprise portions where the continuous groove 4 is preceded or interrupted by a series of embossed pits, so-called header marks (not shown). The header marks may carry information to classify the disk and the values of various parameters, alternatively or additionally to the information in the wobble. Alternatively or additionally, the continuous land portion 5 may also be interrupted by embossed pits (not shown), so-called land pre-pits, as, e.g., in disks according to the DVD-R standard. Alternatively or additionally, embossed pits may also be positioned in between the groove 4 and the land portion 5, as, e.g., in disks according toe the DVD-RAM standard.

FIG. 3 shows an optical disk drive. The optical disk 1 rotates about an axis 22 operated by a motor 23. A laser diode 15 generates an incident optical beam 11, which is directed onto the optical disk via a beam splitter 16, a collimator 17 and an objective lens 18. The beam splitter 16 steers the beam over a 90 degree angle. The collimator 17 produces a substantially parallel incident beam 11a, which is focused by the objective lens 18 into a focussing spot 21 on the track 3. The disk is rotated about the axis 22 by a motor 23 for the spot 21 to scan the tracks along the track. A focus actuator 24 can move the objective lens 18 parallel to its optical axis, i.e., in a direction perpendicular to the disk surface away to or towards the optical disk, to change the depth of the position of the focussing spot 21. A tracking actuator 28 can move the objective lens 18 in the radial direction of the optical disk, to rapidly follow radial excursions of the track when the track 3 is somewhat eccentric to the axis 22. A spherical aberration correction actuator 19 can move the collimator lens 17 parallel to its optical axis in order to adjust the convergence of the beam 11a when the thickness of the transparent cover layer 7 of a BluRay disk deviates from its nominal 0.100 mm. When the optical thickness of the cover layer 7 is smaller than the nominal value, the collimator lens 17 is moved towards the objective lens 18 to produce a somewhat more convergent beam 11a. When this beam is focussed on the optical disk, the difference in spherical aberration originating from the different cover layer thickness is compensated for. Likewise, the difference in spherical aberration originating from the spacer layer can also be compensated for when focussing on the different layers of a multi-layer disk. When the thickness is larger, the collimator lens 17 is moved away from the objective lens 18 to produce a somewhat more divergent beam 11a. Also various alternative methods for spherical aberration correction may be used, such as an actuated liquid crystal lens, an actuated telescope or an actuated dual-objective lens design. A control unit 20 controls the actuators 24, 28 and 19 to keep the optimal positions for the objective lens and the collimator position while the disk is rotating. The optical disk reflects the incident beam. The reflected beam 25 is separated from the incident beam by the beam splitter 16. An astigmatic lens (not drawn) may be positioned in the reflected beam to shape the reflected beam 25. The reflected beam is detected by a sensor 26 generating a sensor signal 40. The sensor signal 40 is passed to a pre-processing circuit 27. The entire optical system is fitted onto a single support so as to constitute an integrally moveable optical head 38. The movement of the optical head is performed by a head motor 29.

As is shown in detail in FIG. 4, the sensor may be a quadruple photodetector 26, having four sensor segments 26A-26D for sensing the intensities of four portions of the reflected beam 25. The sensor signal comprises four channels, A-D, one for each sensor segment. The arrow R represents the relation between the beam portions and the radial direction of the optical disk 1 and the arrow T represents the relation between the beam portions and the tangential direction of the optical disk 1. I.e., sensor 26A and 26B detect intensities corresponding to the inner upper and inner lower quarters respectively of spot 21 as reflected by the optical disk 1, and sensor 26C and 26D detect intensities corresponding to the outer lower and outer upper quarters respectively of spot 21 as reflected by the optical disk 1. The pre-processing unit 27 processes the intensity signals A-D generated by the sensor segments 26A-26D so as to produce a data signal HF=A+B+C+D, a radial tracking error signal or radial push-pull signal PP=(A+B)−(C+D) and, for an astigmatic focussing method, a focus error signal FE=(A+C)−(B+D). The error signal may be of this form, but may also be normalized, with a normalized radial push-pull signal NPP=((A+B)−(C+D))/(A+B+C+D) and a normalized focus error signal NFE=((A−B)/(A+B))+((C−D)/(C+D)). Another focussing method may alternatively be used, such as the spot-size method or the Foucault method, with a corresponding focus error signal FE.

FIG. 5 shows a control unit CON of the optical disk drive. The control unit CON may include one or several microprocessors or digital signal processors. The control unit CON is responsible for several control tasks. The tasks can be executed in the control unit itself, or in an external processor cooperating with the control unit.

The data signal HF is passed to a data recovery mechanism HFPR. The data recovery mechanism HFPR retrieves the data as recorded with the marks 14 on the optical disk 1. The data recovery mechanism HFPR may use a clock recovery circuit comprising a phase-lock loop and a signal detection circuit. The signal detection unit may, e.g., use a so-called slicer to decide on the value of the digital data by comparing the data signal HF with a threshold at the recovered clock moments. The signal detection unit may alternatively be equipped with a partial-response-maximum-likelihood (PRML) detection scheme. The data recovery mechanism HFPR may also be equipped to measure a quality of the signal as recorded by the marks 14 and a reliability of the data recovery. Measures used commonly in the art include measures known as jitter, asymmetry, modulation depth, bit error rate, signal-to-noise ratio (SNR), partial-response signal-to-noise ratio (PRSNR), Sequenced Amplitude Margin (SAM). The recovered data is then further processed to obtain so-called user data by an error correction circuit (ECC), which will not be further described here.

The radial push-pull signal PP (or NPP) is passed to a radial tracking controller RAD. Arrows 31a and 31b denote the capability of the radial tracking controller RAD to control the tracking actuator 28 and the head motor 29, so as to drive the radial position of the objective lens 18 and the optical head 38. For this purpose, the tracking controller RAD controls the tracking actuator 28 such that the tracking error signal substantially has a predetermined value, also called tracking offset. This tracking offset is usually zero. The tracking controller RAD may also be equipped to measure a quality of the radial error signal. Measures used commonly in the art include a push-pull signal amplitude and a track-cross signal amplitude.

The focus error signal FE (or NFE) is passed to a focus controller FOC. Arrow 32 represents the capability of the focus controller FOC to control the focus actuator 24, so as to keep the focussing spot 21 focussed at the correct depth in the track 3. For this purpose, the focus controller FOC controls the focus actuator 24 such that the focus error signal has a predetermined value, also called focus offset.

Arrow 33 denotes the capability of a laser driver controller LDIC to control the laser diode 15, for example to modulate a current through the laser diode 15 according to a write strategy in order to write data onto the optical disk 1. The write strategy is parametrized with a plurality of write strategy parameters. The write strategy is generally defined in a standard, such as the BD-standard. The write strategy parameter values may correspond to laser power levels, e.g., one or more so-called write powers, a erase power (for BD-RE) or a space (for BD-R) power and a bias power. The write strategy parameter values may further correspond to timing information, e.g., a pulse length, a correction to a pulse length, or a delay of a transition of one laser power to another laser power level. The timing information may relate to a 'absolute' reference, preferably a write clock, or be 'relative' to other timing information. The LDIC may be physically located inside the controller CON, but may alternatively be located on the optical head 38 close to the laser diode 15.

Arrow 34 denotes the capability of a spherical aberration correction controller SPH to control the spherical aberration correction actuator 19. The spherical aberration correction actuator 19 drives a spherical aberration correction element. In this exemplary embodiment, the spherical aberration correction actuator 19 drives the position of a collimator lens 17 in order to apply a correction to the incident beam 11 in order to correct thickness variations of the cover layer 7, as was described with reference to FIG. 3.

Arrow 35 denotes the capability of a disk motor controller MOT to control the motor 23. A speed of the motor 23 may be adjusted, e.g., to scan the optical disk 1 with a well-defined linear speed or a well-defined angular speed.

The radial push-pull signal PP (or NPP) is also passed to a wobble processor WOB. When scanning the track, the amplitude radial push-pull signal PP shows a variation as a function of time as a result of the wobble on the disk. This variation is also commonly referred to as the wobble signal WS. The wobble processor WOB may generate a digital wobble data signal WDAT from the wobble signal WS. The digital wobble data signal WDAT may further be processed by a digital processor SYSCON, in order to retrieve so-called wobble data coded in the wobble. The wobble data may, e.g., comprise the physical address of the location on the disk, standard write strategy information such as laser power and timing parameters for writing marks, disk information such as the disk manufacturer. The use of the wobble data will not be further described here. The wobble processor WOB may also retrieve a frequency corresponding to the spatial frequency of the wobble on the disk 1 from the wobble signal WS. When writing marks 14 on the disk by modulating the laser diode 15 with the laser driver controller LDIC, the frequency may be used to derive a disk speed and a write clock in order to have a well-defined time-base for the writing process. The wobble processor WOB may also be equipped to measure a quality of the wobble signal WS. Measures used commonly in the art include wobble amplitude, wobble signal-to-noise ratio (wSNR), wobble error rate.

The digital processor SYSCON may also provide and monitor information, such as control settings, via control lines SYSHCON, SYSRCON, SYSFCON, SYSLCON, SYSSCON, SYSWCON, SYSMCON to and from the data recovery mechanism HFPR, the radial tracking controller RAD, the focus controller FOC, the laser driver controller LDIC, the spherical aberration correction controller SPH, the wobble processor WOB and the disk motor controller MOT. The focus controller FOC may, e.g., receive a focus offset value via control line SYSFCON in order to apply a focus offset to the focus actuator and hence to move the objective lens towards or away from the disk. Likewise, the spherical aberration correction controller SPH may receive a spherical aberration correction value via control line SYSSCON in order to drive the spherical aberration correction actuator 19 to apply a correction to the spherical aberration correction element 17 and hence a apply spherical aberration correction to the focussed spot 21. The digital processor SYSCON may also interface via 79 to external components, e.g., a host computer in which the optical disk drive is mounted.

The control unit CON is arranged for aiming to scan the track 3 on the optical disk 1 with an optimal quality of the spot 21. For this purpose, the digital processor SYSCON can, e.g., retrieve the measurement value of push-pull signal amplitude from the radial tracking controller RAD, the measurement value of jitter from the data recovery mechanism HFPR, and the measurement value of wobble amplitude from the wobble processor WOB. By comparing a selection of these measurement values as a function of one or more operating parameters of the various controllers, the digital processor SYSCON may generate optimal values for the operating parameters.

The control unit CON may also comprise a memory unit (not drawn) or cooperate with an external memory device (not drawn), to store and retrieve e.g. control settings, measurement values, values for the operating parameters, one or more tables comprising information related to disk classes, disk types, disk information, standard write strategies, cluster write strategies, etc.

FIG. 6 schematically shows an embodiment of a method according to the invention. The method is described during use with an optical disk drive after an optical disk has been loaded in the optical disk drive.

The method comprises a sequence of identifying 100 the type of optical disk, determining 102 a cluster write strategy with cluster write strategy parameters, initializing 104 the cluster write strategy parameters with initial cluster write strategy parameter values, and optimizing 106 cluster write strategy parameter values for at least a subset of the cluster write strategy parameters.

In identifying 100 the type of optical disk, the method comprises recognizing the optical disk to be of a CD, DVD or BD disk class. When the disk class is recognized, disk information data is read from the disk, e.g., from reading the information stored in the wobble in the lead-in or lead-out area of the disk. The disk information comprises information about the type of optical disk, e.g., a BD-R 4× disk or a BD-RE 4× disk, with a corresponding standard write strategy with standard write strategy parameters. Standard write strategy parameter values are also comprised in the disk information data, and may be retrieved from the disk.

Based in the recognized type, a cluster write strategy with cluster write strategy parameters is retrieved 102. The cluster write strategy has a smaller number of parameters than the standard write strategy. The cluster write strategy may, e.g., be retrieved from a media table stored in the drive, or derived by the drive from the standard write strategy, e.g., by ignoring some of the standard parameters.

The clustering process will be described in detail below for two types of standard write strategies.

Cluster write strategy parameters are initialized 104 with initial cluster write strategy parameter values. The cluster write strategy parameters may, e.g., be retrieved from a media table stored in the drive comprising default values for power level parameters and pulse timing parameters, or derived by the drive from the standard write strategy values, e.g., by reading all, or a subset of, standard write strategy values from the optical disk and transforming some of the standard write strategy parameter values to related cluster write strategy parameters. The transforming may, e.g., include nullifying a derived parameter value, or copying a standard write strategy parameter value related to a pulse sequence for writing a long mark to a related cluster write strategy parameter value for a pulse sequence for writing a long mark as well as a short mark.

Cluster write strategy parameters are then optimized 106. In this embodiment, optimizing is performed on pairs of cluster write strategy parameters in a specific pre-determined order. Optimizing on a pair is performed by measuring a quality parameter value, e.g., jitter, of written data for a plurality of cluster write strategy parameter test values for pairs of cluster write strategy parameters and performing a two-dimensional fit to the measured quality parameter values, e.g., using the fit procedure as described in WO2006097873A2.

Embodiments of optimizing will be described below in detail for two types of standard write strategies.

FIG. 7 schematically shows an embodiment of an element of the embodiment of FIG. 6. FIG. 7 shows a sequence of optimizing stages 200, 204, 208, 212 on pairs of cluster write strategy parameters. After each optimizing stage 200, 204, 208, a test is performed 202, 206, 210 to check if further optimizing stages are needed, or whether the further optimizing stages can be skipped. The test may, e.g., comprise testing the achieved quality level of data recorded with the cluster write strategy parameter values after that stage. If the achieved quality level is of sufficient quality, e.g., if the achieved jitter value is below a threshold of 10% of a clock period, the subsequent optimizing stages are bypassed and the optimizing is finalized.

The last optimizing stage 212 may comprise further optimizing stages (not shown) until the achieved quality level is of sufficient quality, by further iterating optimizing stages and optimizing other pairs of cluster write strategy parameters, such as pairs of higher order correction parameters. The method will normally not arrive in this stage 212, as the quality level will generally be sufficient after stage 208. However it may happen for some optical disks that the contribution of a higher-order parameter is significant, and the last optimizing stage 212 is entered.

The number of optimizing stages before the last optimizing stage may be different from the number shown in FIG. 7, and may depend on the type of the optical disk. It may also depend on other data stored in the disk information, such as the disk manufacturer.

Embodiments of optimizing stages will be described below in detail for two types of standard write strategies.

It should be noted that the embodiments are described referring to the BD class of optical disks. The invention may be analogously applied for other classes of optical disks, including classes employing other channel coding schemes than the (d=1, k=7) RLL scheme used in the description and associated with the channel coding scheme of the BD class.

FIG. 8 schematically shows another embodiment of a method according to the invention.

The method comprises a sequence of determining 300 a standard write strategy with standard write strategy parameters, and deriving 302 a cluster write strategy with cluster write strategy parameters from the standard write strategy with standard write strategy parameters.

In determining 300 the standard write strategy, the standard write strategy is determined for an optical disk type of an optical disk, e.g., by retrieving from a database accessible by the method. The determining 300 may also be performed manually, by looking up the standard write strategy with standard write strategy parameters for the optical disk type in a library of documentation of optical disk standards.

Deriving 302 the cluster write strategy with cluster write strategy parameters may be achieved by analyzing the standard write strategy and the standard write strategy parameters, clustering the standard write strategy parameters, and simplifying the standard write strategy and the standard write strategy parameters into the cluster write strategy with cluster write strategy parameters with a smaller number of cluster write strategy parameters than the number of standard write strategy parameters based on the clustering.

Embodiments of deriving 302 the cluster write strategy with cluster write strategy parameters will be described below in detail for two types of standard write strategies.

The method may be applied in an optical disk drive, e.g., after an optical disk has been loaded in the optical disk drive and after the type of optical disk has been identified and the associated standard write strategy with standard write strategy parameters, i.e., as part of determining 102 cluster write strategies with cluster write strategy parameters in the embodiment described in reference with FIG. 6. The method may alternatively, e.g., be applied offline on as a method for deriving cluster write strategies with cluster write strategy parameters for a plurality of standard write strategies with standard write strategy parameters. The derived cluster write strategies can then, e.g., be pre-loaded in a table in a memory in the optical disk drive for retrieving cluster write strategies, i.e., as part of determining 102 cluster write strategies with cluster write strategy parameters in the embodiment described in reference with FIG. 6.

FIG. 9 schematically shows another embodiment of a method according to the invention.

The method comprises a sequence of identifying 100 the type of optical disk, determining 102 a cluster write strategy with cluster write strategy parameters, initializing 104 the cluster write strategy parameters, optimizing 106 cluster write strategy parameter values for at least a subset of the cluster write strategy parameters, and writing 108 data onto the optical disk.

Identifying 100 the type of optical disk, determining 102 a cluster write strategy with cluster write strategy parameters, initializing 104 the cluster write strategy parameters and optimizing 106 cluster write strategy parameter values may be performed as described in reference with FIG. 6.

Writing 108 data onto the optical disk may then be performed using the determined write strategy parameter values. Cluster write strategy parameter values may have been optimized values from the optimizing 106, or may have initial values from initializing 104. Cluster write strategy parameter values may be the initial values when the cluster write strategy parameter values was not optimized in optimizing 106, e.g., in reference with FIG. 7, when the cluster write strategy parameter value is optimized in stage Opt3 208, while the test Tst2 206 was positive and the optimizing 106 was stopped before all optimizing stages Opt1, Opt2, Opt3 and Opt4 were executed.

1. Embodiments Comprising a Pulsed Write Strategy

FIG. 10 schematically shows a so-called N−1 pulsed standard write strategy according to a standard for a BD disk. The standard write strategy is defined in the book of Physical Standards for BD and may be applicable for recordable BD-R as well as rewritable BD-RE disks.

The standard write strategy is associated with pulse sequences P2T, P3T, P4T, P5T (not drawn), P6T (not drawn), P7T (not drawn), P8T (not drawn) and P9T.

The pulse sequences of the standard write strategy employ N−1 pulses at a relatively large write power, separated by relatively low bias power separations, in order to write a mark for a runlength NT, with T a channel clock length.

It should be noted that the shown write strategy is one of many possible pulsed write strategies that can be applied in optical disk systems. Also other write strategies with N−1 pulses have been proposed in the literature, as well as write strategies using N/2 pulses and write strategies with N−2 pulses—for runlengths of 3T and longer. The invention also applies to these other types of pulsed strategies.

The pulse sequences P4T, P5T (not drawn), P6T (not drawn), P7T (not drawn), P8T (not drawn) and P9T comprise a first start pulse 1000, a sequence of multipulse pulses 1002 and a first last pulse 1004. The pulses 1000, 1002, 1004 are separated by bias power gaps 1006. The last pulse 1004 is followed by a cooling period 1008 at a cooling power, which is followed by a space period 1010 at the space power.

The pulse sequences P2T comprise a second start pulse 1200. The second start pulse 1200 is followed by a cooling period 1208 at the cooling power, which is followed by a space period 1010 at the space power.

The pulse sequences P3T comprise a third start pulse 1300 and a second last pulse 1304. The second last pulse 1304 is followed by a cooling period 1308 at the cooling power, which is followed by a space period 1010 at the space power.

The pulse sequences can be grouped in a middle section 1350, comprising the multipulse sequence of multipulses 1006 and the last pulse 1004 or 1304 of the corresponding sequence, a start section 1352 comprising the start pulse 1000, 1200, 1300 of the corresponding sequence, and an end section 1354 comprising the cooling period 1008, 1208, 1308 and the transition to the space period 1010 at the space power.

A disk according to a standard and subject to such a standard write strategy carries standard write strategy parameter values, for BD in so-called disk information data stored in the wobble of the disk in the lead-in and lead-out zones of the disk. However, directly applying the standard write strategy parameter values when writing data to the optical disk will generally not result in a satisfactory data quality on the disk. At the same time an extreme sensitivity for some parameters in the standard write strategy is found in practical disc—drive combinations. This complex combination requires optimization of the write strategy parameter values in the drive to obtain acceptable margins.

The standard write strategy shown in FIG. 10 comprises 49 parameters: 4 power levels and 45 timing parameters. Optimizing all parameter combinations will require too much time to record (or OPC) in the drive. The parameters are shown in FIG. 10 in a schematic shorted notation. The exact meaning will be explained below.

The 49 parameters can be listed as:

four power levels:
1. a write power, Pw, applied to the pulses;
2. a bias power, Pb, applied in between the pulses within a mark;
3. a cooling power, Pc, applied after the last pulse of writing a mark;
4. an space power, Ps, applied in between marks to write a space. The space power is also called erase power as erases marks previously written at the location of the space;

The bias power Pb, cooling power Pc and erase power Pe, are parametrized with corresponding bias power factor $\epsilon\_Pb$, cooling power factor $\epsilon\_Pc$ and space power factor $\epsilon\_Ps$, the power factors being relative to the write power, i.e., $Pb = \epsilon\_Pb * Pw,$ $Pc = \epsilon\_Pe * Pw,$ $Ps = \epsilon\_Ps * Pw,$ As a result, changing the write power Pw with a certain factor results in changing the other parameters with the same factor in the standard write strategy, and also in the cluster write strategy.

12 delay parameters relating to the start position dTtop of the first write pulse when writing a mark. For each combination of mark runlength 2T, 3T and ≧4T versus each previous space runlength 2T, 3T, 4T, ≧5T, a standard write strategy parameters are provided. These 3×4=12 parameters can be labeled as:

1-12. dTtop,iTm,jTs, with i=2, . . . , 4 and j=2, . . . , 5;

24 pulse length parameters relating to the length of the first write pulse Ttop of a sequence of pulses when writing a mark, where the total length of the first write pulse is expressed as a sum of an absolute length given in ns and a relative length given in fractional units of the bit clock. For each combination of mark runlength 2T, 3T and ≧4T versus each previous space runlength 2T, 3T, 4T, ≧5T, two standard write strategy parameters are provided. These 2×3×4=12 parameters can be labeled as:

1-12. Ttop,iTm,jTs,ns, with i=2, . . . , 4 and j=2, . . . , 5;

13-24. Ttop,iTm,jTs,fr, with i=2, . . . , 4 and j=2, . . . , 5;

2 pulse length parameters relating to the length of the multipulse pulse Tmp of a sequence of pulses when writing a mark, where the total length of the multipulse pulse is expressed as a sum of an absolute length given in ns and a relative length given in fractional units of the bit clock. These 2× parameters can be labeled as:

1. Tmp,ns,
2. Tmp,fr;

4 pulse length parameters relating to the length of the last pulse Tlp of a sequence of pulses when writing a mark, where the total length of the last pulse is expressed as a sum of an absolute length given in ns and a relative length given in fractional units of the bit clock. These 2×2=4 parameters can be labeled as:

1. Tlp,3T,ns, for 3T marks;
2. Tlp,3T,fr,
3. Tlp,4T,ns, for ≧4T marks,
4. Tlp,4T,fr;

3 space delay or erase delay parameters dTs relating to the delay between the end of the last clock period of the mark and the start of the erase sequence, for a mark runlength 2T, 3T and ≧4T. These 3 parameters can be labeled as:

1-3. dTs,iT, with i=2, . . . , 4.

1. Clustering of the Pulsed Write Strategy

The separation of all timers into mark and previous/next space dependencies may be important for administrating and describing in the Standard Book and storing the optimum write strategy of that disc into the disc information (DI) in the lead-in zone. But it does not reflect the real dependencies of the each group of pulse location in the write strategy. For example, in general the first write pulses for all marks will start more or less at the same time. Only some minor differences for specific runlengths, like the 2T mark, require additional fine tuning. The standard write strategy thus offers more flexibility than actually required. This is exploited in the clustering according to the method according to the invention.

The write strategy parameters are clustered following a formula denoting a general or common part (gen) and one or more corrections Δ for specific marks:

$$T=T(gen)+\Delta T(\text{specific mark})+\Delta T(\text{specific mark, previous runlength}).$$

For most mark runlengths, the previous runlength contribution can be ignored in practice (or removed on an optimization procedure), such that for most write strategy parameters, the clustering can lead to a further simplification:

$$T=T(gen)+\Delta T(\text{specific mark})$$

Also some power parameters are of second order importance, or directly correlated to a more general parameters:

$$P=P(gen)+\Delta P(\text{specific}).$$

In this way a reduction of the number of significant parameters is obtained. This also allows optimisation following a scheme in order of importance of the real dependencies and sensitivities in the write strategy.

For example dTtop for all runlengths is varied at the same time with the same amount. Each mark/space runlength combination is varied the same amount by the T(gen) parameter. In the next step, for example only for the 2T mark runlengths the ΔT (specific mark) is varied. In this way a fast optimisation routine can be designed taking full advantage of the real dependencies in the write strategy.

The clustering by reorganization and simplification/approximation will now be described in detail.

Tmp and Tlp

For the multipulse and last pulse pulse lengths, the contributions in ns and clock fractions are combined in a single value, which will be further referred to as Tmp (ns,fr), Tlp (ns,fr 3T) and Tlp (ns,fr≧4T). E.g., $$Tmp(ns,fr)=Tmp,ns+Tmp,fr*Tw$$

with Tw being the write clock for the disk speed used when writing, and analogously for the other write strategy parameters which have a contribution in ns and in clock fraction.

In practice it is found that, Tlp behaves in practice a special kind of multi pulse. Therefore the multy pulse length Tmp can be used as a general timer, and the last pulse length Tlp can be used with a possible correction ΔTlp_3T or ΔTlp_4T to Tmp if required by the media.

This can be expressed as:

$$Tmp(ns,fr):=Tmp$$

$$Tlp(ns,fr 3T):=Tmp+\Delta Tlp\_3T$$

$$Tlp(ns,fr\geq 4T):=Tmp+\Delta Tlp\_4T$$

with on the left the standard write strategy as defined in the book, and on the right the definitions of the clustered write stategy. The number of parameters is reduced from 6 to 3, with one general parameter Tmp and two specific mark parameters ΔTlp_3T and ΔTlp_4T.

Ttop

Ttop is defined by 2×4×3 write strategy parameters for the standard write strategy. In practice the mark length dependency is only of second order importance of write strategy tuning. All preceding space dependencies are of third order for write strategy tuning and can in general be left out.

Definitions to be used for the cluster write strategy:

$$Ttop(ns,fr,2Ts,2Tm):=Ttop+\Delta Ttop\_2Tm+\Delta Ttop\_2Tm\_2Ts$$

$$Ttop(ns,fr,3Ts,2Tm):=Ttop+\Delta Ttop\_2Tm+\Delta Ttop\_2Tm\_3Ts$$

$$Ttop(ns,fr,4Ts,2Tm):=Ttop+\Delta Ttop\_2Tm+\Delta Ttop\_2Tm\_4Ts$$

$$Ttop(ns,fr,\geq 5Ts,2Tm):=Ttop+\Delta Ttop\_2Tm+\Delta Ttop\_2Tm\_\geq 5Ts$$

$Ttop(ns,fr,2Ts,3Tm):=Ttop+\Delta Ttop\_3Tm+\Delta Ttop\_3Tm\_2Ts$ $Ttop(ns,fr,3Ts,3Tm):=Ttop+\Delta Ttop\_3Tm+\Delta Ttop\_3Tm\_3Ts$ $Ttop(ns,fr,4Ts,3Tm):=Ttop+\Delta Ttop\_3Tm+\Delta Ttop\_3Tm\_4Ts$ $Ttop(ns,fr,\geq 5Ts,3Tm):=Ttop+\Delta Ttop\_3Tm+\Delta Ttop\_3Tm\_\geq 5Ts$ $Ttop(ns,fr,2Ts,4Tm):=Ttop+\Delta Ttop\_4Tm+\Delta Ttop\_4Tm\_2Ts$ $Ttop(ns,fr,3Ts,4Tm):=Ttop+\Delta Ttop\_4Tm+\Delta Ttop\_4Tm\_3Ts$ $Ttop(ns,fr,4Ts,4Tm):=Ttop+\Delta Ttop\_4Tm+\Delta Ttop\_4Tm\_4Ts$ $Ttop(ns,fr,\geq 5Ts,4Tm):=Ttop+\Delta Ttop\_4Tm+\Delta Ttop\_4Tm\_\geq 5Ts$ with on the left the standard write strategy as defined in the book, and on the right the definitions as used cluster write strategy. The number of parameters is reduced from 24 to one general parameter Ttop, 3 second order mark dependant parameters and twelve third order preceding space parameters.

In specific cases where the preheat is only preceding space dependent also the twelve $\Delta Ttop\_2Tm\_2Ts$ to $\Delta Ttop,4T\_m5Ts$ parameters might be clustered into four $\Delta Ttop,2Ts$, $\Delta Ttop,3Ts$, $\Delta Ttop,4Ts$ and $\Delta Ttop,\geq 5Ts$, $Ttop(ns,fr,2Ts,2Tm):=Ttop+\Delta Ttop\_2Tm+\Delta Ttop\_2Ts$ $Ttop(ns,fr,3Ts,2Tm):=Ttop+\Delta Ttop\_2Tm+\Delta Ttop\_3Ts$ $Ttop(ns,fr,4Ts,2Tm):=Ttop+\Delta Ttop\_2Tm+\Delta Ttop\_4Ts$ $Ttop(ns,fr,\geq 5Ts,2Tm):=Ttop+\Delta Ttop\_2Tm+\Delta Ttop\_\geq 5Ts$ $Ttop(ns,fr,2Ts,3Tm):=Ttop+\Delta Ttop\_3Tm+\Delta Ttop\_2Ts$ $Ttop(ns,fr,3Ts,3Tm):=Ttop+\Delta Ttop\_3Tm+\Delta Ttop\_3Ts$ $Ttop(ns,fr,4Ts,3Tm):=Ttop+\Delta Ttop\_3Tm+\Delta Ttop\_4Ts$ $Ttop(ns,fr,\geq 5Ts,3Tm):=Ttop+\Delta Ttop\_3Tm+\Delta Ttop\_\geq 5Ts$ $Ttop(ns,fr,2Ts,4Tm):=Ttop+\Delta Ttop\_4Tm+\Delta Ttop\_2Ts$ $Ttop(ns,fr,3Ts,4Tm):=Ttop+\Delta Ttop\_4Tm+\Delta Ttop\_3Ts$ $Ttop(ns,fr,4Ts,4Tm):=Ttop+\Delta Ttop\_4Tm+\Delta Ttop\_4Ts$ $Ttop(ns,fr,\geq 5Ts,4Tm):=Ttop+\Delta Ttop\_4Tm+\Delta Ttop\_\geq 5Ts$ with on the left the standard write strategy as defined in the book, and on the right the definitions as used in the cluster write strategy. The number of parameters is reduced from 24 to one general parameter Ttop, 3 second order mark dependant parameters and four third order preceding space parameters.

Absorbing $\Delta Ttop\_4Tm$ into Ttop, redefining $\Delta Ttop\_2Tm$ and $\Delta Ttop\_3Tm$ accordingly and nullifying the contributions of four third order preceding space parameters for spaces of 3T and longer (i.e., for $\Delta Ttop\_3Ts$, $\Delta Ttop\_4Ts$ and $\Delta Ttop\_\geq 5Ts$ for which practical experience showed only very little effect), gives:

$Ttop(ns,fr,2Ts,2Tm):=Ttop+\Delta Ttop\_2Tm+\Delta Ttop\_2Ts$ $Ttop(ns,fr,3Ts,2Tm):=Ttop+\Delta Ttop\_2Tm$ $Ttop(ns,fr,4Ts,2Tm):=Ttop+\Delta Ttop\_2Tm$ $Ttop(ns,fr,\geq 5Ts,2Tm):=Ttop+\Delta Ttop\_2Tm$ $Ttop(ns,fr,2Ts,3Tm):=Ttop+\Delta Ttop\_3Tm+\Delta Ttop\_2Ts$ $Ttop(ns,fr,3Ts,3Tm):=Ttop+\Delta Ttop\_3Tm$ $Ttop(ns,fr,4Ts,3Tm):=Ttop+\Delta Ttop\_3Tm$ $Ttop(ns,fr,\geq 5Ts,3Tm):=Ttop+\Delta Ttop\_3Tm$ $Ttop(ns,fr,2Ts,4Tm):=Ttop+\Delta Ttop\_2Ts$ $Ttop(ns,fr,3Ts,4Tm):=Ttop$ $Ttop(ns,fr,4Ts,4Tm):=Ttop$ $Ttop(ns,fr,\geq 5Ts,4Tm):=Ttop$ with on the left the standard write strategy as defined in the book, and on the right the definitions as used in the cluster write strategy. The number of parameters is reduced from 24 to one general parameter Ttop, 2 second order mark dependant parameters and one third order preceding space parameters denoting a thermal balancing correction $\Delta Ttop\_2Ts$ when only a 2T space preceeds a mark.

Ignoring also the thermal balancing correction $\Delta Ttop\_2Ts$, this will be further referred to in a schematic form as:

"$Ttop=Ttop4T+\Delta Ttop\_2/3Tm$"

denoting that the Ttop parameter has the same value Ttop4T for all mark lengths but gets a correction $\Delta Ttop\_2Tm$ or $\Delta Ttop\_3Tm$ for the 2T resp. 3T mark.

dTtop dTtop is defined by 4×3 write strategy parameters for the standard write strategy. In practice the mark length dependency is only of second order importance of write strategy tuning. All preceding space dependencies are of third order for write strategy tuning and can in general be left out.

Definitions to be used for optimisation in the drive:

$dTtop(i,2Ts,2Tm):=dTtop+\Delta dTtop\_2Tm+\Delta dTtop\_2Tm\_2Ts$ $dTtop(i,3Ts,2Tm):=dTtop+\Delta dTtop\_2Tm+\Delta dTtop\_2Tm\_3Ts$ $dTtop(i,4Ts,2Tm):=dTtop+\Delta dTtop\_2Tm+\Delta dTtop\_2Tm\_4Ts$ $dTtop(i,\geq 5Ts,2Tm):=dTtop+\Delta dTtop\_2Tm+\Delta dTtop\_2Tm\_\geq 5Ts$ $dTtop(i,2Ts,3Tm):=dTtop+\Delta dTtop\_3Tm+\Delta dTtop\_3Tm\_2Ts$ $dTtop(i,3Ts,3Tm):=dTtop+\Delta dTtop\_3Tm+\Delta dTtop\_3Tm\_3Ts$ $dTtop(i,4Ts,3Tm):=dTtop+\Delta dTtop\_3Tm+\Delta dTtop\_3Tm\_4Ts$ $dTtop(i,\geq 5Ts,3Tm):=dTtop+\Delta dTtop\_3Tm+\Delta dTtop\_3Tm\_\geq 5Ts$ $dT\text{top}(i,2Ts,4Tm):=dT\text{top}+\Delta dT\text{top}\_4Tm+\Delta dT\text{top}\_4Tm\_2Ts$ $dT\text{top}(i,3Ts,4Tm):=dT\text{top}+\Delta dT\text{top}\_4Tm+\Delta dT\text{top}\_4Tm\_3Ts$ $dT\text{top}(i,4Ts,4Tm):=dT\text{top}+\Delta dT\text{top}\_4Tm+\Delta dT\text{top}\_4Tm\_4Ts$ $dT\text{top}(i,\geq 5Ts,4Tm):=dT\text{top}+\Delta dT\text{top}\_4Tm+\Delta dT\text{top}\_4Tm\_\geq 5Ts$ with on the left the standard write strategy as defined in the book, and on the right the definitions as used in the cluster write strategy. The number of parameters is reduced from 12 to one general parameter dTtop, 3 second order mark dependant parameters and twelve third order preceding space parameters.

In specific cases where the preheat is only preceding space dependent also the twelve $\Delta dT\text{top}\_2Tm\_2Ts$ to $\Delta dT\text{top}\_4Tm\_5Ts$ parameters might be clustered into four $\Delta dT\text{top}\_2Ts$, $\Delta dT\text{top}\_3Ts$, $\Delta dT\text{top}\_4Ts$ and $\Delta dT\text{top}\_\geq 5Ts$, $dT\text{top}(i,2Ts,2Tm):=dT\text{top}+\Delta dT\text{top}\_2Tm+\Delta dT\text{top}\_2Ts$ $dT\text{top}(i,3Ts,2Tm):=dT\text{top}+\Delta dT\text{top}\_2Tm+\Delta dT\text{top}\_3Ts$ $dT\text{top}(i,4Ts,2Tm):=dT\text{top}+\Delta dT\text{top}\_2Tm+\Delta dT\text{top}\_4Ts$ $dT\text{top}(i,\geq 5Ts,2Tm):=dT\text{top}+\Delta dT\text{top}\_2Tm+\Delta dT\text{top}\_\geq 5Ts$ $dT\text{top}(i,2Ts,3Tm):=dT\text{top}+\Delta dT\text{top}\_3Tm+\Delta dT\text{top}\_2Ts$ $dT\text{top}(i,3Ts,3Tm):=dT\text{top}+\Delta dT\text{top}\_3Tm+\Delta dT\text{top}\_3Ts$ $dT\text{top}(i,4Ts,3Tm):=dT\text{top}+\Delta dT\text{top}\_3Tm+\Delta dT\text{top}\_4Ts$ $dT\text{top}(i,\geq 5Ts,3Tm):=dT\text{top}+\Delta dT\text{top}\_3Tm+\Delta dT\text{top}\_\geq 5Ts$ $dT\text{top}(i,2Ts,4Tm):=dT\text{top}+\Delta dT\text{top}\_4Tm+\Delta dT\text{top}\_2Ts$ $dT\text{top}(i,3Ts,4Tm):=dT\text{top}+\Delta dT\text{top}\_4Tm+\Delta dT\text{top}\_3Ts$ $dT\text{top}(i,4Ts,4Tm):=dT\text{top}+\Delta dT\text{top}\_4Tm+\Delta dT\text{top}\_4Ts$ $dT\text{top}(i,\geq 5Ts,4Tm):=dT\text{top}+\Delta dT\text{top}\_4Tm+\Delta dT\text{top}\_\geq 5Ts$ with on the left the standard write strategy as defined in the book, and on the right the definitions as used in the cluster write strategy. The number of parameters is reduced from 12 to one general parameter dTtop, 3 second order mark dependant parameters and four third order preceding space parameters.

Absorbing $\Delta sT\text{top}\_4Tm$ into dTtop, redefining $\Delta dT\text{top}\_2Tm$ and $\Delta dT\text{top}\_3Tm$ accordingly and nullifying irrelevant contributions, from practical experience, gives:

$dT\text{top}(i,2Ts,2Tm):=dT\text{top}+\Delta dT\text{top}\_2Tm$ $dT\text{top}(i,3Ts,2Tm):=dT\text{top}+\Delta dT\text{top}\_2Tm$ $dT\text{top}(i,4Ts,2Tm):=dT\text{top}+\Delta dT\text{top}\_2Tm$ $dT\text{top}(i,\geq 5Ts,2Tm):=dT\text{top}+\Delta dT\text{top}\_2Tm$ $dT\text{top}(i,2Ts,3Tm):=dT\text{top}+\Delta dT\text{top}\_3Tm$ $dT\text{top}(i,3Ts,3Tm):=dT\text{top}+\Delta dT\text{top}\_3Tm$ $dT\text{top}(i,4Ts,3Tm):=dT\text{top}+\Delta dT\text{top}\_3Tm$ $dT\text{top}(i,\geq 5Ts,3Tm):=dT\text{top}+\Delta dT\text{top}\_3Tm$ $dT\text{top}(i,2Ts,4Tm):=dT\text{top}$ $dT\text{top}(i,3Ts,4Tm):=dT\text{top}$ $dT\text{top}(i,4Ts,4Tm):=dT\text{top}$ $dT\text{top}(i,\geq 5Ts,4Tm):=dT\text{top}$ with on the left the standard write strategy as defined in the book, and on the right the definitions as used in the cluster write strategy. The number of parameters is reduced from 12 to one general parameter dTtop and 2 second order mark dependant parameters.

This will be further referred to in a schematic form as:

"$dT\text{top}=dT\text{top}4T+\Delta dT\text{top}\_2/3Tm$"

Pw, Ps, Pb and Pc (Pw, ∈ Ps, ∈ Pb and ∈ Pc)

The low power levels between the multi pulses and the power after the last multi pulse or last pulse are all of required to cooling down. In practise the low power after the last pulse, Pc, is same or close to the power between the write pulses, Pb. The cool power Pc can be considered as second order for optimisation purposes in the drive. In practise is will only minor deviate from Pb.

The erase level Ps nor the difference between Pe and Pc or Pb can be nullified and is kept.

Definitions to be used for optimisation in the drive:

$Pw:=Pw$, $\epsilon\_Ps:=\epsilon\_Ps$, $\epsilon\_Pb:=\epsilon\_Pb$, $\epsilon\_Pc:=\epsilon\_Pb+\Delta\epsilon\_Pc$, with on the left the write power Pw and write power factors $\epsilon\_Ps$, $\epsilon\_Pb$, $\epsilon\_Pc$ as defined in the standard book, and on the right the definitions as used in the cluster write strategy. The number of parameters is reduced from 4 to 3 general parameters Pw, $\epsilon\_Ps$ and $\epsilon\_Pb$, and 1 second order $\Delta\epsilon\_Pc$ parameter.

dTs

The difference between the three space delay parameters can in practice also be ignored to achieve:

$dTs\_4T:=dTs$, $dTs\_3T:=dTs$, $dTs\_2T:=dTs$.

The number of parameters is reduced from 3 to one general parameter dTs.

2. Optimization Sets of Pulsed Write Strategy

For optimization if the write strategy parameter values, the two-dimensional fit model described in WO2006097873A2 will be used. However, the fit can not be applied to any combination of two parameters. Some combinations of parameters do not result in a set of measurement values to which a two-dimensional parabolic fit will fit well, while other combinations provide a robust fit.

Due to the high sensitivity of BD-R and BD-RE media not all combinations of write strategy parameters are suitable. For some combinations, the results are unsuitable to make a second order fit model. Even more, the most logical combinations from physics point of view may yield useless non-parabolic curve with e.g. saddle points or multiple minima.

As an example, FIG. 11a-11d schematically show a measurements of jitter as a function of two write strategy parameter values for various combinations of write strategy parameters. The lines shown in the figures denote contour lines, i.e., lines with equal jitter along the line.

FIG. 11a shows a measurement of jitter as a function of a first set of two write strategy parameter values for two write strategy parameters, schematically denoted with Par1 and Par2, which can be well fitted using a second-order model, as will be clear from the shape of the contour lines shown in the figure.

FIG. 11b shows a measurement of jitter as a function of another set of two write strategy parameter values for two write strategy parameters, schematically denoted with Par3 and Par4. The measurement is shown over a first range of values for the write strategy parameters. The measurement does not show an optimum within the first range of values for the write strategy parameters. One may expect that the optimum may be outside the first range of the values of the two parameters at values of Par3 and/or Par4 below the minimum value of the first range. Using, e.g. the extended second-order model of WO2006097873A2 with an iterative search-and-fit method, a second measurement may be done over a second range of values for the write strategy parameters, with the second range extending to lower values of the parameters Par3 and/or Par4 and preferably partly overlapping the first range. The second measurement may be well-suited for applying a second-order fit. The fit may result in an optimum inside the second range of the values of the two parameters Par3 and/or Par4, thus resulting in optimized values for the parameters Par3 and/or Par4. However, this second measurement in the iteration procedure required additional execution time, adversely resulting in an increase of the overall time required for optimization of the write strategy parameters. This combination of parameters is thus preferably not used in the optimization. Preferably, combinations are selected which can be optimized with a single measurement.

FIG. 11c and FIG. 11d show measurements of jitter as a function of other sets of two write strategy parameter values for two write strategy parameters, schematically denoted with Par5 and Par6, and with Par7 and Par8 respectively, which can not be well fitted using a second-order model. E.g., FIG. 11c shows clearly no optimum, and FIG. 11d shows contour lines corresponding to a saddle-point dependency and which does not have a usable optimum.

For example the combination of multipulse pulse length Tmp and bias power Pb (or $\epsilon\_Pb$) seems very logic from physics point of view: the amount of energy in each multi-write pulse is controlled by the width of that pulse. It is expected that too much energy in the pulse can be compensated by the first next power: the bias power. Although that theory is found to be correct as such trend is visible, this combination showed on all tested BDR media saddle type curves lacking a clear optimum parameter set.

Another example is the combination of the cooling power dTs and the cooling power level factor $\Delta\epsilon\_Pc$, shown in FIG. 11c. In this case the curves is bending is such a direction that a second order fit model results in a wrong optimum somewhere for outside the used window, and far from any real optimum.

Also the combination dTtop and Ttop seem feasible, however in some cases it was observed that the curve narrows around the optimum parameter combination. In those case the second order model fit produces saddle type curves, as shown in FIG. 11d. That gives highly instable results.

An embodiment of the method according to the invention thus comprises using the best combinations of write strategy parameters using the cluster write strategy parameters. Also an optimum order for the fastest iteration will be described in the next section.

From the analysis of the "fittability" of the combinations of two write strategy parameters, a list of optimum parameter combinations can be obtained.

E.g., the most critical parameter Tmp (multi pulse length) only has a limited number of suitable and relevant partners: the start of the first pulse dTtop and the recording power Pw.

The next important parameters are dTtop and Ttop describing the start and length of the first pulse of a pulse sequence. That combination shows unstable results for some media due to a saddle in the curve, but combine well with several other timing parameters, e.g., dTtop can be well combined with e.g. $\Delta dTtop\_2T$ or $\Delta dTtop\_3T$, and Ttop can be well combined with e.g. $\Delta Ttop\_2T$ or $\Delta Ttop\_3T$.

3. Optimization Order of Pulsed Write Strategy

An embodiment of the method according to the invention thus comprises using an optimum order of optimizing combinations of write strategy parameters for a robust and fast convergence.

For optimal recording deviations from the standard write strategy parameter values as retrieved, e.g. from the disk, from a write strategy table in the drive memory or from a media table in the drive memory, are required. Especially the multipulse pulse length Tmp, the start pulse delay dTtop and the start pulse length Top need tuning. Next priority is the bias power Pb and space/erase power Pe. Less relevant seems the cool power Pc: in all tested cases is hardly differs from the bias power Pb and therefore confirms its generalisation (as described above, via the corresponding write power factors $\epsilon\_Pc:=\epsilon\_Pb+\Delta\epsilon\_Pc$). Also the space delay dTs is less sensitive for BDR and can be optimised in a later phase, of still required by the achieved quality level.

However, the timers related to the shorted runlength 2T seem to be critical:

$\Delta Ti\_2T$ is frequently non-zero. Therefore these 2T related timers are suitable candidates to be mixed with the general dTtop and Ttop.

The order from the most critical or sensitive parameter to the least important parameter of the generalised N-1 write strategy parameters is as follows:

1. Tmp, Ttop, dTtop;
2. bias power factor $\epsilon\_Pb$, space/erase power factor $\epsilon\_Ps$;
3. $\Delta dTtop\_2T$, $\Delta Ttop\_2T$;
4. dTs;
5. $\Delta Tlp\_3T$, $\Delta Tlp\_4T$, $\Delta dTtop\_3T$, $\Delta Ttop\_3T$;
6. $\Delta dTs\_2T$, $\Delta dTs\_3T$;

Of course the iteration process can be stopped earlier if satisfactory results are obtained. It is expected that in most cases only Tmp, dTtop, Ttop and $\epsilon\_Ps$ are tuned.

Because the three parameters Tmp, dTtop and Ttop are difficult to be combined with each other in a joint optimization, two or preferably three iteration steps are required of joint optimization of one of these theree parameters with another parameter. The most efficient order is first Tmp, then dTtop and then Ttop. However, any perturbation of the order leads to the same results for the parameter values, although the perturbations require a somewhat longer time.

Tmp is best combined with the recording power Pw. For the dTtop and Ttop combinations with the second level parameters ΔdTtop_2T, ΔTtop_2T are suitable.

This results in the first 3 steps:
1. Tmp and power Pw;
2. dTtop and ΔdTtop_2T;
3. Ttop and ΔTtop_2T;

in each of these steps, the two write strategy parameters are jointly optimized using a two-dimensional fit to the measurement of a quality level of data recorded with a plurality of test values of the two parameters.

A second stage may comprise the optimisation of the other powers: the bias power Pb and the erase/space power Pe. Because these powers do not combine well together, again two steps are required though the order is arbitrary:
1. bias power and several combinations possible, preferably power Pw
2. erase power and several combinations possible, preferably dTs.

In a third stage, the least important parameters may be optimised:
1. ΔTlp_3T and ΔTlp_4T;
2. ΔdTs_2T and ΔdTs_3T;
3. higher order parameters depending on the previous space length.

The optimization thus comprises a series of optimizations in a most efficient optimisation order:

Opt1. Tmp and power Pw;
Opt2. dTtop and ΔdTtop_2T;
Opt3. Ttop and ΔTtop_2T;
Opt4. bias power factor ε_Pb and power Pw;
Opt5. erase power factor ε_Pe and dTs;
Opt6. ΔTlp_3T and ΔTlp_4T;
Opt7. ΔdTs_2T and ΔdTs_3T;

wherein the order of Opt2 and Opt3 may be switched, and the order of Opt4 and Opt5 may be switched.

After each optimization Opt1-Opt7, the quality level may be tested and compared to a threshold. Once the quality level is below the threshold, e.g. once the jitter is below a 10% threshold, the rest of the optimization steps may be skipped, as discussed above in reference to FIG. 7.

II. Embodiments Comprising a Castle Write Strategy

FIG. 12 schematically shows a so-called castle standard write strategy according to a standard for a BD disk. The castle standard may, e.g., be used for high-speed recording, where a pulsed strategy would require such a short length of the individual pulses that those pulses are difficult to produce with well-defined length and power.

The standard write strategy is associated with pulse sequences PS2T, PS3T, PS4T, PS5T (not drawn), PS6T (not drawn), PS7T (not drawn), PS8T (not drawn) and PS9T. The pulses of a pulse sequence are immediately adjacent to each other, such that each pulse sequence effectively forms a single shaped pulse. One can note that this is one the major differences compared to the class of pulsed write strategies discussed above.

The pulse sequences PS4T, PS5T (not drawn), PS6T (not drawn), P7ST (not drawn), PS8T (not drawn) and PS9T comprise a first start pulse 2000, a first following pulse 2006 and a first end pulse 2004. The pulses 2000, 2002, 2004 are immediately adjacent to each other. The end pulse 2004 is followed by a cooling period 2008 at a cooling power, which is followed by a space period 2010 at the space power.

The pulse sequence PS2T comprise a second start pulse 2200. The second start pulse 2200 is followed by a cooling period 2208, which is followed by a space period 2010 at the space power.

The pulse sequence PS3T comprise a third start pulse 2300 and a second following pulse 2306. The second following pulse 2306 is followed by a cooling period 2308, which is followed by a space period 2010 at the space power.

The pulse sequences can be grouped in a middle section 2350, comprising the following pulse 2306 of the corresponding sequence, a start section 2352 comprising the start pulse 2000, 2200, 2300 of the corresponding sequence, and an end section 2354 comprising the transition to the cooling period 2008, the cooling period 2008 and the beginning of to the space period 2010 at the space power.

The standard write strategy employs four power levels: a first write power level Pw1, a second write power level Pw2, a cooling power level Pc, and a space power level Ps. The first start pulse 2000, the first end pulse 2004, the second start pulse 2200 and the third start pulse 2300 are at the first power level Pw1. The first following pulse 2006 and the second following pulse 2306 are at the second write power Pw2. The cooling periods 2008, 2208, 2308 are at the cooling power level Pc. The space period is at the space power level Ps.

The second write power level Pw2, the cooling power level Pc, and the space power level Ps are parametrized in the standard write strategy with power factors relating to the first write power level Pw1, i.e. with a second write power factor ε_Pw2, a cooling power factor ε_Pc, and a space power factor ε_Ps as follows:

$$Pw2 = \epsilon\_Pb * Pw1,$$

$$Pc = \epsilon\_Pc * Pw1,$$

$$Ps = \epsilon\_Ps * Pw1.$$

The standard write strategy employs additionally 30 timing parameters, which depend on the runlength of the mark to be written with the write strategy sequence for a mark, denoted by m, of a specific length and which depend on runlength of the preceding or following space, denoted by s, as is shown in the following table. Columns of the table relate to the runlength of the mark: 2T, 3T and 4 and longer. Rows of the tables relate to a dependency on the runlength of the preceding or following space.

|  | 2Tm | 3Tm | ≧4Tm |
|---|---|---|---|
| dTtop |  |  |  |
| Preceding 2Ts | dTtop_2Tm_2Ts | dTtop_3Tm_2Ts | dTtop_4Tm_2Ts |
| Preceding 3Ts | dTtop_2Tm_3Ts | dTtop_3Tm_3Ts | dTtop_4Tm_3Ts |
| Preceding 4Ts | dTtop_2Tm_4Ts | dTtop_3Tm_4Ts | dTtop_4Tm_4Ts |
| Preceding ≧5Ts | dTtop_2Tm_5Ts | dTtop_3Tm_5Ts | dTtop_4Tm_5Ts |
| Ttop |  |  |  |
| Preceding 2Ts | Ttop_2Tm_2Ts | Ttop_3Tm_2Ts | Ttop_4Tm_2Ts |
| Preceding 3Ts | Ttop_2Tm_3Ts | Ttop_3Tm_3Ts | Ttop_4Tm_3Ts |
| Preceding 4Ts | Ttop_2Tm_4Ts | Ttop_3Tm_4Ts | Ttop_4Tm_4Ts |
| Preceding ≧5Ts | Ttop_2Tm_5Ts | Ttop_3Tm_5Ts | Ttop_4Tm_5Ts |
| dTc |  |  |  |
| All following Ts |  | dTc_3Tm | dTc_4Tm |
| Tlp |  |  |  |
| All following Ts |  |  | Tlp_4Tm |
| dTs |  |  |  |
| All following Ts | dTs_2Tm | dTs_3Tm | dTs_4Tm |

The parameters in the table are to be understood as:

dTtop_2Tm_2Ts denotes the dTtop pulse delay applied to the first pulse of the pulse sequence for writing a 2T mark after a preceding 2T space;

dTtop_2Tm_5Ts denotes the dTtop pulse delay applied to the first pulse of the pulse sequence for writing a 2T mark after a preceding 5T space or longer;

dTtop_iTm_jTs denotes the dTtop pulse delay applied to the first pulse of the pulse sequence for writing a iT mark after a preceding jT space, i=2, . . . , 4 and j=2, . . . , 5;

Ttop_2Tm_3Ts denotes the Ttop pulse length of the first pulse of the pulse sequence for writing a 2T mark after a preceding 3T space;

Ttop_iTm_jTs denotes the Ttop pulse length of the first pulse of the pulse sequence for writing a iT mark after a preceding jT space, i=2, . . . , 4 and j=2, . . . , 5;

dTc_3Tm denotes the cooling delay of the last pulse of the pulse sequence for writing a 3T mark before a following space of any length;

dTc_jTm denotes the cooling delay of the last pulse of the pulse sequence for writing a jT mark before a following space of any length, j=3, 4;

Tlp_4Tm denotes the Tlp pulse length of the last pulse of the pulse sequence for writing a 4T mark or longer before a following space of any length;

Tlp_kTm denotes the Tlp pulse length of the last pulse of the pulse sequence for writing a kT mark or longer before a following space of any length, k=4;

dTs_2Tm denotes the space delay of the start of the space sequence at the end of a 2T mark for a following space of any length;

dTs_iTm denotes the space delay of the start of the space sequence at the end of a iT mark for a following space of any length.

1. Clustering of a Castle Write Strategy

Timing Parameters

As it would take too much tome to iteratively optimize each of the 30 timing parameters of the standard write strategy, together with the 4 power levels, the parameters are grouped, i.e. clustered, into a smaller set of parameters. In this exemplary embodiment, this is achieved by removing the dependency on the length of the preceding space, and the dependency on the length of the following space.

This can be listed as:

dTtop_iTm_2Ts=dTtop_iTm_3Ts=dTtop_iTm_4Ts=dTtop_iTm_5Ts=dTtop_iTm, for 1=2, . . . , 4;

Ttop_iTm_2Ts=Ttop_iTm_3Ts=Ttop_iTm_4Ts=Ttop_iTm_5Ts=Ttop_iTm, for 1=2, . . . , 4;

And is summarized in the table below:

| | 2Tm | 3Tm | ≧4Tm |
|---|---|---|---|
| dTtop | | | |
| Preceding 2Ts | dTtop_2Tm | dTtop_3Tm | dTtop_4Tm |
| Preceding 3Ts | | | |
| Preceding 4Ts | | | |
| Preceding ≧ 5Ts | | | |
| Ttop | | | |
| Preceding 2Ts | Ttop_2Tm | Ttop_3Tm | Ttop_4Tm |
| Preceding 3Ts | | | |
| Preceding 4Ts | | | |
| Preceding ≧ 5Ts | | | |
| dTc | | | |
| All following Ts | | dTc_3Tm | dTc_4Tm |

-continued

| | 2Tm | 3Tm | ≧4Tm |
|---|---|---|---|
| Tlp | | | |
| All following Ts | | | Tlp_4Tm |
| dTs | | | |
| All following Ts | | dTs | | i.e., the cluster write strategy only comprises 9 timing parameters:

dTtop_iTm, with i=2, 3, 4;
Ttop_iTm, with i=2, 3, 4;
dTc_jTm, with j=3, 4;
Tlp_KTm, with k=4;
dTs.

The four power parameters Pw1, Pw2, Pc and Ps are all maintained.

For the cluster write strategy parameters where the dependence of the space has been removed, the value nay be assigned corresponding to the standard write strategy parameter value of a long space, i.e., the values of the write strategy parameters may be derived from the values of the standard write strategy parameters as follows:

dTtop_iTm=dTtop_iTm_5Ts;
Ttop_iTm=Ttop_iTm_5Ts.

For the other parameters, the values of the write strategy parameters may be set to the values of the corresponding standard write strategy parameters.

Powers

The cluster write strategy comprises the same four power parameters as the standard write strategy, i.e., the first write power level Pw1, the second write power level Pw2 parametrized with the second write power factor ε_Pw2 as ε_Pb*Pw1, the cooling level Pc parametrized with the cooling power factor ε_Pc as ε_Pc*Pw1, and a space level Ps parametrized with the space power factor ε_PS as ε_Ps*Pw1.

2. Optimization Sets of a Castle Write Strategy

For optimization if the write strategy parameter values, the two-dimensional fit model described in WO2006097873A2 may be used. However, the fit can not be applied to any combination of the parameters. Some combinations of parameters do not result in a set of measurement values to which a two-dimensional parabolic fit will fit well, while other combinations provide a robust fit.

As an example, FIG. 11a schematically shows a measurement of jitter as a function of two write strategy parameter values: the second write power Pw2 is shown along the horizontal axis and the first pulse delay dTtop_4T for a 4T mark is shown along the vertical axis. The lines are contour lines of equal jitter. One can easily see that a two-dimensional parabola will fit well to the measurement, with a minimum jitter around the position labeled with a triangle.

From the analysis of the "fittability" of the combinations of two write strategy parameters, a list of optimum parameter combinations can be obtained.

A sensitivity analysis showed that the sensitivity to the write strategy parameters from the most critical or sensitive parameter to the least important parameter of the write strategy is as follows:

1. Pw1, Pw2, dTtop_2T, Ttop_2T;
2. ε_Ps, dTtop_3T, dTtop_4T
3. dTc_3T, dTc_4T;

4. $\epsilon\_Pc$, $Ttop\_3T$;
5. $Ttop\_4T$, $Tlp\_4T$;
6. $dTs$.

3. Optimization Order of a Castle Write Strategy

From the optimum parameter combinations and the parameter sensitivity list, a recipe can be defined to optimize the parameters in the most efficient order, i.e., with the minimum number of steps and the maximum speed of convergence. This advantageously limits the amount of time needed for the write strategy parameter optimization, and uses a minimum amount of disc space.

These constraints lead to following recipe of combinations to be jointly optimized as described above with reference to FIG. 7 in a sequence of six stages Opt1 to Opt6:

Opt1: $Pw2$ and $dTc\_4T$;
Opt2: $dTtop\_2T$ and $dTtop\_4T$;
Opt3: $Ttop\_2T$ and $Ttop\_3T$;
Opt4: $\epsilon\_Ps$ and $dTc\_3T$;
Opt5: $dTtop\_3T$ and $\epsilon\_Pc$;
Opt6: $Ttop\_4T$ and $Tlp\_4T$.

Stages Opt4, Opt5 and Opt6 are further optimization stages. In practice stage Opt6 can be skipped if the second write power Pw2 is relatively close to the first write power Pw1, i.e., if $PW2>70\%*Pw2$, as the effect of the length of the small "boost parts" at the beginning and end of the pulse sequence is only small when measured in total power content.

The sequence of optimizations is preferably preceded by an initial optimization of the first write power Pw1 in an initial optimal power calibration (OPC) as is familiar to the person skilled in the art and comprising a single-parameter optimization, in particular of minimizing jitter as a function as a plurality of first write power test values.

The sequence of optimizations nay also be followed by another optimal power calibration (OPC) of the first write power Pw1, in order to achieve a further fine-adjustment of the power levels.

One can note that Opt1 relates to the total power in a pulse sequence according to the write strategy, and to the middle section 2300 of the longer pulse sequences.

Opt2 and Opt3 relate in particular to the start section 2303 of the pulse sequence.

Opt4, Opt5 and Opt6 are further optimization stages relating to different sections 2300, 2302, 2304 of the pulse sequence.

The methods described above may be implemented in an optical disk drive, preferably in the processor CON, or system controller SYSCON of the optical disk drive, or in a apparatus cooperating with an optical disk drive and communicating with the processor CON or system controller SYSCON over the interface 79.

In FIG. 13, an overview is given of a computer arrangement that can be used to carry out the method according to the invention. The arrangement comprises a processor 601 for carrying out arithmetic operations.

The processor 601 is connected to a plurality of memory components, including a hard disk 605, Read Only Memory (ROM) 607, Electrically Erasable Programmable Read Only Memory (EEPROM) 609, and Random Access Memory (RAM) 611. Not all of these memory types need necessarily be provided. Moreover, these memory components need not be located physically close to the processor 601 but may be located remote from the processor 601.

The processor 601 is also connected to means for inputting instructions, data etc. by a user, like a keyboard 613, and a mouse 615. Other input means, such as a touch screen, a track ball and/or a voice converter, known to persons skilled in the art may be provided too.

A reading unit 617 connected to the processor 601 is provided. The reading unit 617 is arranged to read data from and possibly write data oil a data carrier like a floppy disk 619 or a CD 621. Other data carriers may be tapes, DVD, BD, etc. as is known to persons skilled in the art.

The processor 601 is also connected to a printer 623 for printing output data on paper, as well as to a display 603, for instance, a cathode-ray tube monitor or a LCD (Liquid Crystal Display) screen, or any other type of display known to persons skilled in the art.

The processor 1 may be connected to a communication network 627, for instance, the Public Switched Telephone Network (PSTN), a Local Area Network (LAN), a Wide Area Network (WAN), etc. by means of I/O means 625. The processor 601 may be arranged to communicate with other communication arrangements through the network 627.

The data carrier 619, 621 may comprise a computer program product in the form of data and instructions arranged to provide the processor with the capacity to perform a method in accordance with the invention. However, such computer program product may, alternatively, be downloaded via the telecommunication network 627.

The processor 601 may be implemented as stand alone system, or as a plurality of parallel operating processors each arranged to carry out subtasks of a larger computer program, or as one or more main processors with several sub-processors. Parts of the functionality of the invention may even be carried out by remote processors communicating with processor 601 through the network 627.

It should be noted that the above-mentioned embodiments illustrate rather than limit the invention, and that those skilled in the art will be able to design many alternative embodiments without departing from the scope of the appended claims. E.g., a digital signal may be used where an analogue signal is suggested and vice versa, without departing from the scope of the invention and the appended claims. Also, the invention may be analogously applied for e.g. other disk types and other standard write strategies than those explicitly described in the embodiments above. In the claims, any reference signs and symbols placed between parentheses shall not be construed as limiting the claim.

The invention claimed is:

1. A method for determining write strategy parameter values for writing data on an optical disk from a group of optical disks of different types using an optical disk drive, comprising:

identifying (100) the type of optical disk using the optical disk drive, the type of optical disk associated with a standard write strategy with standard write strategy parameters, determining (102) a cluster write strategy with cluster write strategy parameters, the number of cluster write strategy parameters being smaller than the number of standard write strategy parameters, initializing (104) the cluster write strategy parameters with initial cluster write strategy parameter values, optimizing cluster write strategy parameter values for at least a subset of the cluster write strategy parameters in a pre-determined optimization order, and determining an optimum of a quality parameter, testing the optimum of the quality parameter against a pre-determined threshold, and wherein the optimizing of the cluster write strategy parameter values is stopped once the optimum of the quality parameter exceeds the pre-determined threshold.

2. The method according to claim 1, wherein
the cluster write strategy parameters have been organized in optimization sets (Opt1, Opt2, Opt3, Opt4) of subsets of cluster write strategy parameters, and
the optimizing (106) is performed on optimization sets (Opt1, Opt2, Opt3, Opt4) of cluster write strategy parameters.

3. The method according to claim 1, wherein
the cluster write strategy is associated with a plurality of pulse sequences (P2T, P3T, P4T, P9T; PS2T, PS3T, PS4T, PS9T),
at least a subset of the pulse sequences comprise at least a start section (1352; 2352), a middle section (1350; 2350) and an end section (1354; 2354), and
the plurality of optimization sets comprises at least:
  a first optimization set of cluster write strategy parameter values relating to the middle section (1350; 2350), and
  a second optimization set of cluster write strategy parameter values relating to one of the group of the start section (1352; 2352) and the end section (1354; 2354), and wherein
the pre-determined optimization order is such that the optimization of the second optimization set is performed after the optimization of the first optimization set.

4. The method according to claim 3, wherein
the plurality of optimization sets further comprises:
  a third optimization set of cluster write strategy parameter values relating to the other of the group of the start section (1352) and the end section (1354), and wherein
the pre-determined optimization order is such that the optimization of the second optimization set is performed after the optimization of the first optimization set, and optimization of the third optimization set is performed after the optimization of the second optimization set.

5. The method according to claim 4, wherein
the second optimization set of cluster write strategy parameter values relates to the start section (1352), and
the third optimization set of cluster write strategy parameter values relates to the end section (1354).

6. The method according to claim 1, wherein the cluster write strategy is associated with at least a first sequence (P4T, P9T) of pulses (1000, 1002, 1004) at a write power (Pw), the first sequence (P4T, P9T) of pulses comprising at least one or more multipulse pulses (1002) parametrized with at least a multipulse pulse length (TmP), wherein
the write power (Pw) and the multipulse pulse length (Tmp) are jointly optimized.

7. The method according to claim 1, wherein the cluster write strategy is associated with at least:
  a first sequence (P4T, P9T) of pulses (1000, 1002, 1004), the first sequence (P4T, P9T) of pulses comprising a first start pulse (1000), and
  a second sequence (P2T) comprising a second start pulse (1200), wherein
  the first start pulse (1000) is parametrized with at least a first start pulse delay (dTtop),
  the second start pulse (1200) is parametrized with at the first start pulse delay (dTtop) and a first start pulse delay correction (ΔdTtop_2T), and wherein
  the first start pulse delay (dTtop) and the first start pulse delay correction (ΔdTtop_2T) are jointly optimized.

8. The method according to claim 1, wherein the cluster write strategy is associated with at least:
  a first sequence (P4T, P9T) of pulses (1000, 1002, 1004), the first sequence of pulses (P4T, P9T) comprising a first start pulse (1000), and
  a second sequence (P2T) comprising a second start pulse (1200), wherein
  the first start pulse (1000) is parametrized with at least a first start pulse length (Ttop),
  the second start pulse (1200) is parametrized with at least the first start pulse length (Ttop) and a first start pulse length correction (ΔdTtop_2T), and wherein
  the first start pulse length (Ttop) and the first start pulse length correction (ΔdTtop_2T) are jointly optimized.

9. The method according to claim 1, wherein the cluster write strategy is associated with at least:
  a space sequence (1010) parametrized with at least a space power factor (ε_Ps) and a space delay (dTs),
  and wherein
  the space power (ε_Ps) and the space delay (dTs) are jointly optimized.

10. The method according to claim 1, wherein the cluster write strategy is associated with at least:
  a first sequence (P4T, P9T) of pulses (1000, 1002, 1004) at a write power (Pw), the first sequence (P4T, P9T) of pulses comprising:
    a first start pulse (1000) parametrized with at least a first start pulse delay (dTtop) and a first start pulse length (Ttop), and
    at least one or more multiplules pulses (1002) parametrized with at least a multipulse pulse length (Tmp);
  a second sequence (P2T) comprising a second start pulse (1200), parametrized with at least a first start pulse delay (dTtop), a first start pulse delay correction (ΔdTtop_2T), a first start pulse length (Ttop) and a first start pulse length correction (ΔdTtop_2T); and
  a space sequence (1010) parametrized with at least a space power factor (ε_Ps) and a space delay (dTs);
and wherein
first a joint optimization is performed of the write power (Pw) and the multipulse pulse length (Tmp), and
then a joint optimization is performed selected from the group consisting of:
  a) a joint optimization of the first start pulse delay (dTtop) and the first start pulse delay correction (ΔdTtop_2T),
  b) a joint optimization of the first start pulse length (Ttop) and the first start pulse length correction (ΔdTtop_2T), and
  c) a joint optimization of the space power (ε_Ps) and the space delay (dTs).

11. The method according to claim 1, wherein the cluster write strategy is associated with at least:
  a first sequence (P4T, P9T) of pulses (1000, 1002, 1004) at a write power (Pw), the first sequence (P4T, P9T) of pulses comprising:
    a first start pulse (1000) parametrized with at least a first start pulse delay (dTtop) and a first start pulse length (Ttop), and
    at least one or more multipulses (1002) parametlized with at least a multipulse pulse length (Tmp);
  a second sequence (P2T) comprising a second start pulse (1200), parametrized with at least
  a first start pulse delay (dTtop), a first start pulse delay correction (ΔdTtop_2T), a first start pulse length (Ttop) and a first start pulse length correction (ΔdTtop_2T); and a space sequence (1010) parametrized with at least a space power factor ($\epsilon$_Ps) and a space delay (dTs);

and wherein first a joint optimization is performed of the write power (Pw) and the multipulse pulse length (Tmp), then at least one joint optimization is performed selected from the group consisting of:

a) a joint optimization of the first start pulse delay (dTtop) and the first start pulse delay correction ($\Delta$dTtop_2T), b) a joint optimization of the first start pulse length (Ttop) and the first start pulse length correction ($\Delta$dTtop_2T), and then a joint optimization is performed of the space power ($\epsilon$_Ps) and the space delay (dTs).

12. The method according to claim 1, wherein the cluster write strategy is associated with at least:

a first shaped pulse (PS4T, PS9T) comprising a sequence of pulses (2000, 2006, 2004), the sequence of pulses comprising a first start pulse (2000) parametrized with at least a first write power (Pw1), a first following pulse (2006) at a second write power (Pw2) immediately adjacent to the first start pulse (2000) and parametrized with at least a second write power factor ($\epsilon$_Ps), and a first end pulse (2004) at the first write power (Pw1) immediately adjacent to the first following pulse (2006) and parametrized with at least the first write power (Pw1), a first cooling period (2008) immediately adjacent to the first end pulse (2004) and parametrized with at least a first cooling delay (dTc_4T) denoting the delay of the first cooling period, and wherein the second write power factor ($\epsilon$_Pw2) and the first cooling delay (dTc_4T) are jointly optimized.

13. The method according to claim 1, wherein the cluster write strategy is associated with at least:

a first shaped pulse (PS4T, PS9T) comprising a sequence of pulses (2000, 2006, 2004), the sequence of pulses comprising a first start pulse (2000) at a first write power (Pw1) and parametrized with at least a first start pulse delay (dTtop_4T), a first following pulse (2006) at a second write power (Pw2) immediately adjacent to the first start pulse (2000) and a first end pulse (2004) at the first write power (Pw1) immediately adjacent to the first following pulse (2006), and a second shaped pulse (PS2T) comprising a first start pulse (2200) parametrized with at least a second start pulse delay (dTtop_2T), and wherein the first start pulse delay (dTtop_4T) and the second start pulse delay (dTtop_2T) are jointly optimized.

14. The method according to claim 1, wherein the cluster write strategy is associated with at least:

a second shaped pulse (PS2T) comprising a first start pulse (2200) parametrized with at least a second start pulse length (Ttop_2T), and a third shaped pulse (PS3T) comprising a sequence of pulses (2300, 2306), the sequence of pulses comprising a third start pulse (2300) at the first write power (Pw1) and parametrized with at least a third start pulse length (Ttop_3T), and a second following pulse (2306) at the second write power (Pw2) immediately adjacent to the second start pulse (2300), and wherein the second start pulse length (Ttop_2T) and the third start pulse length (Ttop_3T) are jointly optimized.

15. The method according to claim 1, wherein the cluster write strategy is associated with at least:

a first shaped pulse (PS4T, PS9T) comprising a sequence of pulses (2000, 2006, 2004), the sequence of pulses comprising:

a first start pulse (2000) parametrized with at least a first write power (Pw1) and a first start pulse delay (dTtop_4T), a first following pulse (2006) at a second write power (Pw2) immediately adjacent to the first start pulse (2000) and parametrized with at least a second write power factor ($\epsilon$_Pw2), and a first end pulse (2004) at the first write power (Pw1)) immediately adjacent to the first following pulse (2006), a first cooling period (2008) immediately adjacent to the first end pulse (2004) and parametrized with at least a first cooling delay (dTc_4T) denoting the delay of the first cooling period, a second shaped pulse (PS2T) comprising a first start pulse (2200) parametrized with at least a second start pulse delay (dTtop_2T) and a second start pulse length (Ttop_2T), and a third shaped pulse (PS3T) comprising a sequence of pulses (2300, 2306), the sequence of pulses comprising:

a third start pulse (2300) at the first write power (Pw1) and parametrized with at least a third start pulse length (Ttop_3T), and a second following pulse (2306) at the second write power (Pw2) immediately adjacent to the second start pulse (2300);

and wherein first a joint optimization is performed of second write power factor ($\epsilon$_Pw2) and the first cooling delay (dTc_4T), then a joint optimization is performed selected from the group consisting of:

a) a joint optimization of the first start pulse delay (dTtop_4T) and the second start pulse delay (dTtop_2T), and b) a joint optimization of the second start pulse length (Ttop_2T) and the third start pulse length (Ttop_3T).

16. The method according to claim 1, wherein the cluster write strategy is associated with at least:

a first shaped pulse (PS4T, PS9T) comprising a sequence of pulses (2000, 2006, 2004), the sequence of pulses comprising:

a first start pulse (2000) parametrized with at least a first write power (Pw1) and a first start pulse delay (dTtop_4T), a first following pulse (2006) at a second write power (Pw2) immediately adjacent to the first start pulse (2000) and parametrized with at least a second write power factor ($\epsilon$_Pw2), and a first end pulse (2004) at the first write power (Pw1)) immediately adjacent to the first following pulse (2006), a first cooling period (2008) immediately adjacent to the first end pulse (2004) and parametrized with at least a first cooling delay (dTc_4T) denoting the delay of the first cooling period, a second shaped pulse (PS2T) comprising a first start pulse (2200) parametrized with at least a second start pulse delay (dTtop_2T) and a second start pulse length (Ttop_2T), and a third shaped pulse (PS3T) comprising a sequences of pulses (2300, 2306), the sequence of pulses comprising:

a third start pulse (2300) at the first write power (Pw1) and parametrized with at least a third start pulse length (Ttop_3T), and a second following pulse (2306) at the second write power (Pw2) immediately adjacent to the second start pulse (2300);

and wherein first a joint optimization is performed of second write power factor $\epsilon$_Pw2) and the first cooling delay (dTc_4T), then at least one joint optimization is performed selected from the group consisting of:
  a) a joint optimization of the first start pulse delay (dTtop_4T) and the second start pulse delay (dTtop_2T), and
  b) a joint optimization of the second start pulse length (Ttop_2T) and the third start pulse length (Ttop_3T), and then the other joint optimization is performed selected from the group consisting of:
  a) a joint optimization of the first start pulse delay (dTtop_4T) and the second start pulse delay (dTtop_2T), and
  b) a joint optimization of the second start pulse length (Ttop_2T) and the third start pulse length (Ttop_3T).

17. A computer program product arranged to be loaded in a processor (CON, SYSCON, 601) and to perform the method of claim 1.

* * * * *